United States Patent
Kubota et al.

(10) Patent No.: US 10,514,113 B2
(45) Date of Patent: Dec. 24, 2019

(54) METAL PIPE HAVING THICKENED END PORTION, AND METHOD OF MANUFACTURING SAME

(71) Applicant: NIPPON STEEL & SUMITOMO METAL CORPORATION, Tokyo (JP)

(72) Inventors: Hiroaki Kubota, Toyota (JP); Masaaki Mizumura, Kisarazu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 56 days.

(21) Appl. No.: 15/545,789

(22) PCT Filed: Feb. 18, 2016

(86) PCT No.: PCT/JP2016/054689
§ 371 (c)(1),
(2) Date: Jul. 24, 2017

(87) PCT Pub. No.: WO2016/133156
PCT Pub. Date: Aug. 25, 2016

(65) Prior Publication Data
US 2018/0017190 A1    Jan. 18, 2018

(30) Foreign Application Priority Data

Feb. 18, 2015 (JP) ................................ 2015-029643

(51) Int. Cl.
*F16L 9/00*    (2006.01)
*B21J 5/08*    (2006.01)
(Continued)

(52) U.S. Cl.
CPC ............ *F16L 9/006* (2013.01); *B21D 22/025* (2013.01); *B21D 26/033* (2013.01); *B21D 41/02* (2013.01);
(Continued)

(58) Field of Classification Search
CPC .. E21B 17/16; E21B 17/00; F16L 9/04; F16L 9/006
(Continued)

(56) References Cited

U.S. PATENT DOCUMENTS 3,067,539 A * 12/1962 McCool ................. A01K 93/00
292/210
3,784,238 A * 1/1974 Chance ................... E21B 17/16
175/325.1
(Continued)

FOREIGN PATENT DOCUMENTS

EP 0331539 A1 9/1989
JP 57-127535 A 8/1982
(Continued)

OTHER PUBLICATIONS

Extended European Search Report, dated Sep. 5, 2018, issued in counterpart European Patent Application No. 16752542.7.
(Continued)

*Primary Examiner* — Patrick F Brinson
(74) *Attorney, Agent, or Firm* — Birch, Stewart, Kolasch & Birch, LLP

(57) ABSTRACT

A metal pipe having a thickened end portion, the metal pipe includes: when viewed in a longitudinal direction of the metal pipe, a thin portion which has a thickness $t_0$; a first thickened portion which is provided on one end and has a thickness T which is larger than the thickness $t_0$; and a first taper portion which is provided between the thin portion and the first thickened portion and has the thickness which gradually increases from $t_0$ to T; when a hardness of an inner surface of the first thickened portion is measured in a circumferential direction and the hardness is plotted with respect to a position in the circumferential direction, in which a waveform representing a high hardness portion having a hardness which is 95% or more of a maximum
(Continued)

hardness in the circumferential direction and a waveform representing a low hardness portion having a hardness which is less than 95% of the maximum hardness alternately appear, and a plurality of combinations of the waveform representing the high hardness portion and the waveform representing the low hardness portion appear.

6 Claims, 19 Drawing Sheets

(51) Int. Cl.
  *B21D 22/02* (2006.01)
  *B21D 26/033* (2011.01)
  *B21D 41/02* (2006.01)
  *F16L 9/04* (2006.01)
  *B21K 21/12* (2006.01)
  *B21D 53/88* (2006.01)

(52) U.S. Cl.
  CPC .............. *B21J 5/08* (2013.01); *B21K 21/12* (2013.01); *F16L 9/04* (2013.01); *B21D 53/88* (2013.01)

(58) Field of Classification Search
  USPC .................................. 138/99; 285/288.1, 45
  See application file for complete search history.

(56) References Cited

U.S. PATENT DOCUMENTS

| | | | |
|---|---|---|---|
| 4,273,159 A * | 6/1981 | Bolton | B23K 9/046 138/109 |
| 4,845,972 A | 7/1989 | Takeuchi et al. | |
| 4,970,887 A | 11/1990 | Lorieux | |
| 4,987,961 A * | 1/1991 | McNeely, Jr. | E21B 7/04 138/109 |
| 5,184,495 A | 2/1993 | Chunn et al. | |
| 5,203,194 A | 4/1993 | Marquardt | |
| 5,286,069 A * | 2/1994 | Wilson | E21B 17/042 285/114 |
| 5,562,312 A * | 10/1996 | Carlin | F16L 13/02 228/168 |
| 5,743,301 A * | 4/1998 | Winship | B21C 37/16 138/109 |
| 5,853,199 A * | 12/1998 | Wilson | E21B 17/00 285/45 |
| 5,956,988 A | 9/1999 | Beste et al. | |
| 9,493,993 B1 * | 11/2016 | Dallas | E21B 17/04 |

FOREIGN PATENT DOCUMENTS

| | | |
|---|---|---|
| JP | 59-76638 A | 5/1984 |
| JP | 60-166137 A | 8/1985 |
| JP | 61-279327 A | 12/1986 |
| JP | 63-71936 U | 5/1988 |
| JP | 10-507410 A | 7/1998 |
| JP | 10-291043 A | 11/1998 |
| JP | 11-333537 A | 12/1999 |
| JP | 2013-158818 A | 8/2013 |
| WO | 2005/102555 A1 | 11/2005 |

OTHER PUBLICATIONS

Japanese Notice of Allowance for Japanese Application No. 2017-500729, dated Apr. 2, 2019, with English translation.
International Search Report for PCT/JP2016/054689 dated Apr. 19, 2016.
Miura et al., "Basic Study on Thickening Processing of Plate", The Proceedings of the Japanese Spring Conference for the Technology of Plasticity, 2001, pp. 39-40, total 8 pages.
Written Opinion of the International Searching Authority for PCT/JP2016/054689 (PCT/ISA/237) dated Apr. 19, 2016.
Chinese Search Report and Office Action, dated Jun. 25, 2018 for corresponding Chinese Application No. 201680009411.4, with an English translation of the Chinese Search Report.
Indian Office Action, dated Sep. 17, 2019, for Indian counterpart Application No. 201717024361, along with an English translation.

* cited by examiner

METAL PIPE HAVING THICKENED END PORTION, AND METHOD OF MANUFACTURING SAME

TECHNICAL FIELD OF THE INVENTION

The present invention relates to a metal pipe having a thickened end portion and a method of manufacturing the same.

Priority is claimed on Japanese Patent Application No. 2015-29643, filed on Feb. 18, 2015, the content of which is incorporated herein by reference.

RELATED ART

From the viewpoint of improving fuel consumption and safety of an automobile, improvements on weight saving, strength, and rigidity are required for a vehicle body component and a mounted part (hereinafter, simply referred to as a "part") of an automobile. In order to realize these, it is effective to increase a thickness of a member at only a portion which contributes strength or rigidity and decrease the thickness of the member at the other portions.

Moreover, in order to prevent a portion of a part which is welded to other parts or members by arc welding or the like from melting down during welding, it is sometimes necessary to increase a thickness of the member. Accordingly, the thickness of the member being not increased over the entire part and the thickness of the member being increased only in the portion in which welding is performed are effective for weight saving of the part.

As a part of an automobile which uses a metal pipe as a material, there is a suspension member, a torsion beam, or a shaft part (drive shaft, half shaft, or the like) of a power transmission system. When the above-described part of an automobile is manufactured, in upsetting processing which is performed in the related art, the thickness of a portion of a metal pipe in a longitudinal direction is increased by applying a pressure to the metal pipe in the longitudinal direction.

Non-Patent Document 1 discloses a technology which partially thickens a steel plate although it is not a metal pipe.

PRIOR ART DOCUMENT

Patent Document

[Non-Patent Document 1] Norihiko MIURA, Munenori ONO: The Proceedings of the 2001 Japanese Spring Conference for the Technology of Plasticity (2001), pages 39-40

DISCLOSURE OF THE INVENTION

Problems to be Solved by the Invention

In the technology disclosed in Non-Patent Document 1, in a case where $T/t_0$ which is a ratio (hereinafter, referred to as a thickness increase ratio) which is obtained by dividing a thickness T after the thickening by a thickness $t_0$ before the thickening is a predetermined value (for example, 1.4) or more, buckling may occur during the thickening. Also when the metal pipe is thickened, in a case where the thickness increase ratio increases, buckling occurs, and it is difficult to perform desired thickening.

The present invention is made in consideration of the above-described circumstances, and an object thereof is to provide a metal pipe having a thickened end portion in which at least one end is thickened at a large thickness increase ratio in a longitudinal direction without having a buckling portion, and a method of manufacturing the same.

Means for Solving the Problem

The present invention adopts the following means so as to solve the above-described problems and attain the object.

(1) According to an aspect of the present invention, there is provided a metal pipe having a thickened end portion, the metal pipe includes: when viewed in a longitudinal direction of the metal pipe, a thin portion which has a thickness $t_0$; a first thickened portion which is provided on one end and has a thickness T which is larger than the thickness $t_0$; and a first taper portion which is provided between the thin portion and the first thickened portion and has the thickness which gradually increases from $t_0$ to T; in which, when a hardness of an inner surface of the first thickened portion is measured in a circumferential direction and the hardness is plotted with respect to a position in the circumferential direction, a waveform representing a high hardness portion having a hardness which is 95% or more of a maximum hardness in the circumferential direction and a waveform representing a low hardness portion having a hardness which is less than 95% of the maximum hardness alternately appear, and a plurality of combinations of the waveform representing the high hardness portion and the waveform representing the low hardness portion appear.

(2) In the metal pipe having a thickened end portion according to (1), the thickness T of the first thickened portion may be 1.2 times or more than the thickness $t_0$ of the thin portion.

(3) In the metal pipe having a thickened end portion according to (1) or (2), a length of the first thickened portion in the longitudinal direction may be 3 times or less than an outer circumferential length of the first thickened portion.

(4) In the metal pipe having a thickened end portion according to any one aspect of (1) to (3), the metal pipe may further include: when viewed in the longitudinal direction of the metal pipe, a second thickened portion which is provided on the other end and has a thickness $T_a$ which is larger than $t_0$; and a second taper portion which is provided between the thin portion and the second thickened portion and has the thickness which gradually increases from $t_0$ to $T_a$.

(5) In the metal pipe having a thickened end portion according to (4), the thickness $T_a$ of the second thickened portion may be 1.2 times or more than the thickness $t_0$ of the thin portion.

(6) In the metal pipe having a thickened end portion according to (4) or (5), a length of the second thickened portion in the longitudinal direction may be 3 times or less than an outer circumferential length of the second thickened portion.

(7) According to an aspect of the present invention, there is provided a method of manufacturing a metal pipe having a thickened end portion by axially pressing one end of the metal pipe toward the other end, the method includes: when the metal pipe is viewed in a longitudinal direction, a first process of thickening a die non-abutting portion by axially pressing a first axial press punch toward the other end side of the metal pipe; in which the first process is performed: on the one end side of the metal pipe in a state where the first axial press punch having an outer circumferential shape corresponding to an inner circumferential shape of the metal pipe is inserted, an outer circumferential surface of the metal pipe abuts on an inner surface of a first die in the die abutting portion on the outer circumferential surface of the metal pipe, and the outer circumferential surface of the metal pipe does not come into contact with the inner surface of the first die in the die non-abutting portion on the outer circumferential surface of the metal pipe; and on the other end side of the metal pipe in a state where the metal pipe is disposed in the first die such that the outer circumferential surface of the metal pipe abuts on the inner surface of the first die.

In addition, according to an aspect of the present invention, there is provided a method of manufacturing a metal pipe having a thickened end portion by axially pressing one end of the metal pipe toward the other end, the method includes: a second process of thickening a die abutting portion by axially pressing a second axial press punch toward the other end side of the metal pipe; in which the second process is performed: on the one end side of the metal pipe in a state where the second axial press punch is inserted, and the outer circumferential surface of the metal pipe does not come into contact with an inner surface of a second die in the die abutting portion of the metal pipe while the outer circumferential surface of the metal pipe abuts on the inner surface of the second die in the die non-abutting portion of the metal pipe; and on the other end side of the metal pipe in a state where the metal pipe is disposed in the second die such that the outer circumferential surface of the metal pipe abuts on the inner surface of the second die.

(8) In the method of manufacturing a metal pipe having a thickened end portion according to (7), an entire of the outer circumferential surface of the metal pipe may abut on the inner surface of the first die at the other end side of the metal pipe in the first process.

(9) In the method of manufacturing a metal pipe having a thickened end portion according to (7) or (8), the other end of the metal pipe may be positioned with respect to the first die in the first process.

(10) In the method of manufacturing a metal pipe having a thickened end portion according to any one aspect of (7) to (9), the entire of the outer circumferential surface of the metal pipe may abut on the inner surface of the second die at the other end side of the metal pipe in the second process.

(11) In the method of manufacturing a metal pipe having a thickened end portion according to any one aspect of (7) to (10), the other end of the metal pipe may be positioned with respect to the second die in the second process.

(12) In the method of manufacturing a metal pipe having a thickened end portion according to any one aspect of (7) to (11), in the first process: a third axial press punch having an outer circumferential shape corresponding to the inner circumferential shape of the metal pipe may be inserted; the outer circumferential surface of the metal pipe may abut on the inner surface of the first die in the die abutting portion on the outer circumferential surface of the metal pipe; the outer circumferential surface of the metal pipe may not come into contact with the inner surface of the first die in the die non-abutting portion on the outer circumferential surface of the metal pipe; and the third axial press punch may be further axially pressed toward the one end side of the metal pipe when the first axial press punch is axially pressed toward the other end side of the metal pipe.

In addition, in the method of manufacturing a metal pipe having a thickened end portion according to any one aspect of (7) to (11), in the second process: a fourth axial press punch having an outer circumferential shape corresponding to the inner circumferential shape of the metal pipe may be inserted; the outer circumferential surface of the metal pipe may not come into contact with the inner surface of the second die in the die abutting portion on the outer circumferential surface of the metal pipe; the outer circumferential surface of the metal pipe may abut on the inner surface of the second die in the die non-abutting portion on the outer circumferential surface of the metal pipe; and the fourth axial press punch may be further axially pressed toward the one end side of the metal pipe when the second axial press punch is axially pressed toward the other end side of the metal pipe.

(13) According to another aspect of the present invention, there is provided a method of manufacturing a metal pipe having a thickened end portion by axially pressing one end of the metal pipe toward the other end in a state where the metal pipe is disposed in a die such that an entire of an outer circumferential surface of the metal pipe abuts on an inner surface of the die, the method includes: when the metal pipe is viewed in a longitudinal direction, a first process of thickening of an axial press punch non-abutting portion by axially pressing a first axial press punch toward the other end side of the metal pipe; in which the first process is performed: on the one end side of the metal pipe in a state where an inner circumferential surface of the metal pipe abuts on an outer surface of the first axial press punch in the axial press punch abutting portion on the inner circumferential surface of the metal pipe and the inner circumferential surface of the metal pipe does not come into contact with the outer surface of the first axial press punch in the axial press punch non-abutting portion on the inner circumferential surface of the metal pipe.

In addition, according to another aspect of the present invention, there is provided a method of manufacturing a metal pipe having a thickened end portion by axially pressing one end of the metal pipe toward the other end in a state where the metal pipe is disposed in a die such that an entire of an outer circumferential surface of the metal pipe abuts on an inner surface of the die, the method includes: a second process of thickening an axial press punch abutting portion by axially pressing a second axial press punch toward the other end side of the metal pipe; in which the second process is performed: on the one end side of the metal pipe in a state where the inner circumferential surface of the metal pipe does not come into contact with an outer surface of the second axial press punch in the axial press punch abutting portion of the metal pipe and the inner circumferential surface of the metal pipe abuts on the outer surface of the second axial press punch in the axial press punch non-abutting portion of the metal pipe.

(14) In the method of manufacturing a metal pipe having a thickened end portion according to (13), the other end of the metal pipe may be positioned with respect to the die in the first process.

(15) In the method of manufacturing a metal pipe having a thickened end portion according to (13) or (14), the other end of the metal pipe may be positioned with respect to the die in the second process.

(16) In the method of manufacturing a metal pipe having a thickened end portion according to any one aspect of (13) to (15), in which in the first process: the inner circumferential surface of the metal pipe may abut on an outer surface of a third axial press punch in the axial press punch abutting portion of the inner circumferential surface of the metal pipe; the inner circumferential surface of the metal pipe may not come into contact with the outer surface of the third axial press punch in the axial press punch non-abutting portion on the inner circumferential surface of the metal pipe; and the third axial press punch may be further axially pressed toward the one end side of the metal pipe when the first axial press punch is axially pressed toward the other end side of the metal pipe.

Moreover, in the method of manufacturing a metal pipe having a thickened end portion according to any one aspect of (13) to (15), in which in the second process: the inner circumferential surface of the metal pipe may not come into contact with an outer surface of a fourth axial press punch in the axial press punch abutting portion on the inner circumferential surface of the metal pipe; the inner circumferential surface of the metal pipe may abut on the outer surface of the fourth axial press punch in the axial press punch non-abutting portion of the inner circumferential surface of the metal pipe; and the fourth axial press punch may be further axially pressed toward the one end side of the metal pipe when the second axial press punch is axially pressed toward the other end side of the metal pipe.

(17) According to still another aspect of the present invention, there is provided a method of manufacturing a metal pipe having a thickened end portion by axially pressing one end of a metal pipe toward the other end, the method includes: when the metal pipe is viewed in a longitudinal direction, a first process of thickening an axial press punch non-abutting portion and a die non-abutting portion by axially pressing a first axial press punch toward the other end side of the metal pipe; in which the first process is performed: on the one end side of the metal pipe in a state where an inner circumferential surface of the metal pipe abuts on an outer surface of the first axial press punch in the axial press punch abutting portion on the inner circumferential surface of the metal pipe, the inner circumferential surface of the metal pipe does not come into contact with the outer surface of the first axial press punch in the axial press punch non-abutting portion on the inner circumferential surface of the metal pipe, an outer circumferential surface of the metal pipe abuts on an inner surface of a first die in the die abutting portion on the outer circumferential surface of the metal pipe, and the outer circumferential surface of the metal pipe does not come into contact with the inner surface of the first die in the die non-abutting portion on the outer circumferential surface of the metal pipe; on the other end of the metal pipe in a state where the metal pipe is disposed in the first die such that the entire of the outer circumferential surface of the metal pipe abuts on the inner surface of the first die.

Moreover, according to still another aspect of the present invention, there is provided a method of manufacturing a metal pipe having a thickened end portion by axially pressing one end of a metal pipe toward the other end, the method includes: a second process of thickening an axial press punch abutting portion and a die abutting portion by axially pressing a second axial press punch toward the other end side of the metal pipe, in which the second process is performed: on the one end side of the metal pipe in a state where the inner circumferential surface of the metal pipe abuts on an outer surface of the second axial press punch in the axial press punch non-abutting portion on the inner circumferential surface of the metal pipe, the inner circumferential surface of the metal pipe does not come into contact with the outer surface of the second axial press punch in the axial press punch abutting portion on the inner circumferential surface of the metal pipe, the outer circumferential surface of the metal pipe abuts on an inner surface of a second die in the die non-abutting portion on the outer circumferential surface of the metal pipe, and the outer circumferential surface of the metal pipe does not come into contact with the inner surface of the second die in the die abutting portion on the outer circumferential surface of the metal pipe; and on the other end of the metal pipe in a state where the metal pipe is disposed in the second die such that the entire of the outer circumferential surface of the metal pipe abuts on the inner surface of the second die.

(18) In the method of manufacturing a metal pipe having a thickened end portion according to any one aspect of (7) to (17), the first process may be performed in a state where a pressure medium is injected inside the metal pipe.

(19) In the method of manufacturing a metal pipe having a thickened end portion according to any one aspect of (7) to (18), the second process may be performed in a state where a pressure medium is injected inside the metal pipe.

Effects of the Invention

According to the aspects, it is possible to provide a metal pipe having a thickened end portion in which at least one end is thickened at a large thickness increase ratio in a longitudinal direction without having a buckling portion, and a method of manufacturing the same.

EMBODIMENTS OF THE INVENTION

Hereinafter, a metal pipe having a thickened end portion according to an embodiment and a method of manufacturing the same will be described with reference to the drawings.

(First Embodiment, Metal Pipe 1' Having Thickened End Portion)

First, a metal pipe 1' having a thickened end portion according to a first embodiment will be described.

Figure 1:
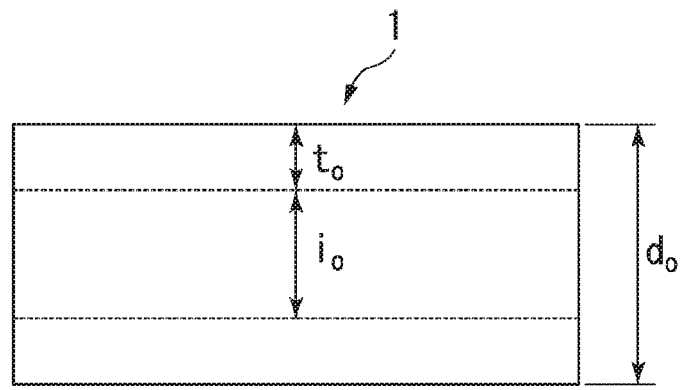
FIG. 1 is a schematic view showing a metal pipe which is used in a metal pipe having a thickened end portion when viewed in a longitudinal direction.
Figure 2:
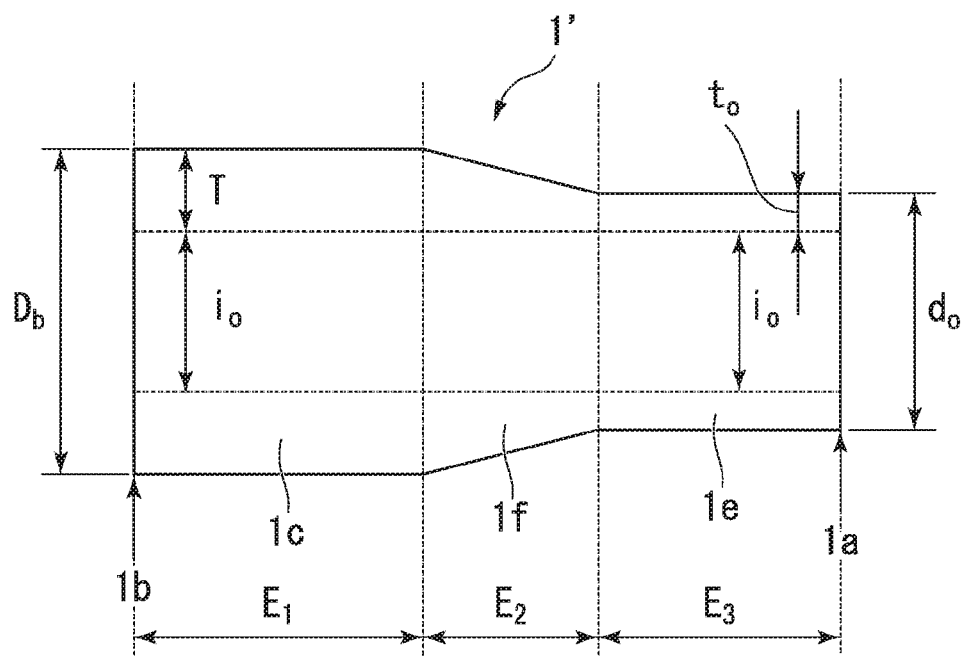
FIG. 2 is a schematic view showing a metal pipe having a thickened end portion according to a first embodiment when viewed in the longitudinal direction.

FIG. 1 is a schematic view showing a metal pipe 1 which is used in the metal pipe 1' having a thickened end portion when viewed in a longitudinal direction. FIG. 2 is a schematic view showing the metal pipe 1' having a thickened end portion according to the first embodiment when viewed in the longitudinal direction.

As shown in FIG. 1, the metal pipe 1 which is used in the metal pipe 1' having a thickened end portion has the same thickness $t_0$, the outer diameter $d_0$, and an inner diameter $i_0$ in the entire longitudinal direction. The metal pipe 1 is not particularly limited as long as a ratio $t_0/d_0$ which is obtained by dividing the thickness $t_0$ by the outer diameter $d_0$ is 0.01 to 0.2. In addition, preferably, the thickness $t_0$ is 1.2 to 15 mm, and preferably, the outer diameter $d_0$ is 12 mm to 120 mm.

In addition, a material of the metal pipe 1 is not particularly limited, and includes steel, stainless steel, aluminum, titanium, or the like. A specific example in a case where steel is used as the material of the metal pipe 1 includes a carbon steel pipe for machine structure STKM11A (defined by JIS G3445) having tensile strength of 290 MPa or more.

As shown in FIG. 2, in the metal pipe 1' having a thickened end portion according to the present embodiment, a thickness on one end 1b is T while a thickness on the other end 1a is $t_0$ similarly to the metal pipe 1. In the present embodiment, T is a larger value than $t_0$. That is, in the metal pipe 1' having a thickened end portion of the present embodiment, one end 1b is thickened over a longitudinal length $E_1$ so as to form an one end side thickened portion (first thickened portion) 1c. In addition, in the metal pipe 1' having a thickened end portion, a portion having the thickness $t_0$ of the metal pipe 1 is referred to as a thin portion 1e. The thin portion 1e is a portion which has the thinnest thickness when viewed in the longitudinal direction and has a longitudinal length $E_3$. A taper portion (first taper portion) 1f which has a longitudinal length $E_2$ is formed between the one end side thickened portion 1c and the thin portion 1e.

As shown in FIG. 1, the metal pipe 1 has the thickness $t_0$ in the longitudinal direction of the metal pipe 1. However, by performing a method of manufacturing a metal pipe 1' having a thickened end portion described below on the metal pipe 1, the thickness of the other end 1a is stayed as $t_0$ and is not changed, and the thickness of the one end 1b is changed from $t_0$ to T. That is, by performing the method of manufacturing a metal pipe 1' having a thickened end portion on the metal pipe 1, the other end 1a of the metal pipe 1 is not thickened, and the one end 1b of the metal pipe 1 is thickened. Moreover, in the taper portion 1f, the thickness gradually increases from $t_0$ to T from the thin portion 1e toward the one end side thickened portion 1c.

Preferably, $T/t_0$ is 1.2 or more, which is a ratio (hereinafter, referred to as a thickness increase ratio) obtained by dividing the thickness T of the one end side thickened portion 1c formed on the one end 1b of the metal pipe 1' having a thickened end portion according to the present embodiment by the thickness $t_0$ of the thin portion 1e. Since the thickness increase ratio $T/t_0$ is 1.2 or more, fatigue strength becomes the same as that of a base material when the one end side thickened portion 1c is welded to other members, which is preferable.

More preferably, $T/t_0$ is 1.4 or more, and still more preferably, $T/t_0$ is 2.0 or more.

In addition, the thickness T of the one end side thickened portion 1c is an average of measurement values of the thicknesses which are measured at a plurality of portions of the one end side thickened portion 1c. Similarly, the thickness $t_0$ of the thin portion 1e is an average of the thicknesses which are measured at a plurality of portions of the thin portion 1e. Moreover, in the calculations of the thickness T and $t_0$, the thickness of the taper portion if is not considered.

In the metal pipe 1' having a thickened end portion according to the present embodiment, an outer circumferential surface on the one end 1b side of the metal pipe 1 is thickened, and the above-described thickness increase ratio is obtained. Accordingly, an outer diameter $d_b$ of the one end 1b side of the metal pipe 1' having a thickened end portion is larger than the outer diameter (an outer diameter of the other end 1a side of the metal pipe 1' having a thickened end portion) $d_0$ of the metal pipe 1.

Meanwhile, in the metal pipe 1' having a thickened end portion according to the present embodiment, an inner circumferential surface of the metal pipe 1 is not thickened. Accordingly, the metal pipe 1' having a thickened end portion according to the present embodiment has the same inner diameter $i_0$ as the inner diameter $i_0$ of the metal pipe 1 in the entire longitudinal direction.

Next, a hardness distribution of the metal pipe 1' having a thickened end portion will be described with reference to FIGS. 3A to 3C.

Figure 3A:
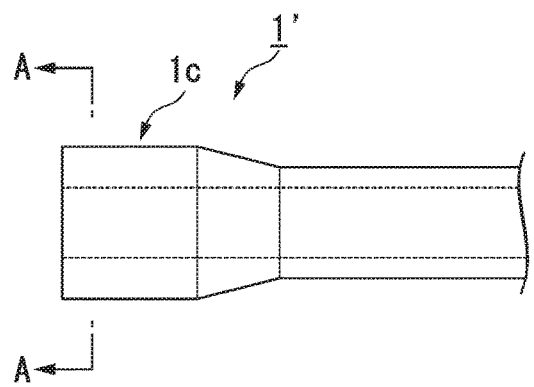
FIG. 3A is a schematic view showing a metal pipe having a thickened end portion used in simulation of FIG. 3C.
Figure 3B:
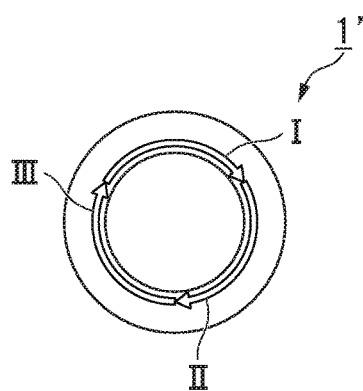
FIG. 3B is a sectional view taken along line A-A of FIG. 3A.
Figure 3C:
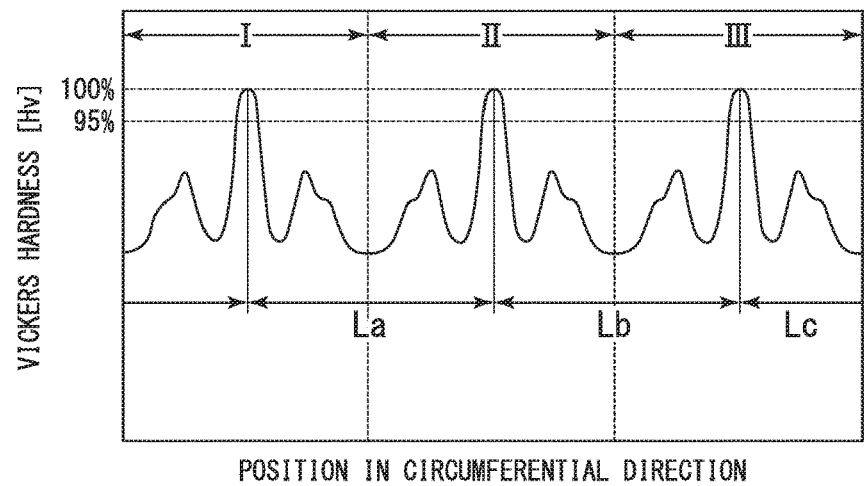
FIG. 3C is a graph showing a hardness distribution of the metal pipe having a thickened end portion according to the present embodiment which is obtained by simulation.

FIG. 3A is a schematic view showing the metal pipe 1' having a thickened end portion used in simulation of FIG. 3C. FIG. 3B is a sectional view taken along line A-A of FIG. 3A. FIG. 3C is a graph showing a hardness distribution of the metal pipe 1' having a thickened end portion according to the present embodiment which is obtained by the simulation. Specifically, FIG. 3C is a graph showing a simulation result with respect to a circumferential distribution of the hardness on the inner surface of the metal pipe 1' having a thickened end portion in the one end side thickened portion 1c in a case where the metal pipe 1 is processed by the method of manufacturing the metal pipe 1' having a thickened end portion described below under a condition in which the thickness increase ratio $T/t_0$ is 2.0.

In addition, FIG. 3C shows a simulation result in a case where having a carbon steel pipe for machine structure (STKM11A) having the outer diameter D of 48.6 mm and the thickness $t_0$ of 4.0 is used as the metal pipe 1. Moreover, in the simulation shown in FIG. 3C, a method of thickening three circumferential locations of the metal pipe 1 at a portion on the one end 1b side of the metal pipe 1 is used as the method of manufacturing the metal pipe 1' having a thickened end portion.

As shown in FIGS. 3A to 3C, a portion (hereinafter, referred to as a high hardness portion) in which hardness has 95% or more of the maximum hardness in the circumferential direction of the metal pipe 1' having a thickened end portion is formed at three locations at approximately equal intervals in the circumferential direction of the one end side thickened portion 1c.

Moreover, in the metal pipe 1' having a thickened end portion according to the present embodiment, in a case where center-to-center distances of three high hardness portions (not shown) are respectively defined as La, Lb, and Lc in a unit of mm, a difference between the maximum value and the minimum value of La, Lb, and Lc is 0.2 times or less than an outer circumferential length of the other end 1a. Since the difference between the maximum value and the minimum value of the center-to-center distances La, Lb, and Lc of the high hardness portion (not shown) is 0.2 times or less than the outer circumferential length of the other end 1a, a thickness distribution of the final product is uniform in the circumferential direction, which is preferable.

In FIG. 3C, since the method of manufacturing the metal pipe 1' having a thickened end portion is the simulation in which the case of using the method of thickening the three circumferential locations of the metal pipe 1 at a portion on the one end 1b side of the metal pipe 1 is assumed, the high hardness portions (not shown) are formed at three locations at approximately equal intervals in the circumferential direction of the one end side thickened portion 1c. However, the number of the high hardness portions (not shown) formed in the circumferential direction of the one end side thickened portion 1c is not limited to this. The number of the high hardness portions (not shown) formed in the circumferential direction of the one end side thickened portion 1c is arbitrarily determined according to the usage of the metal pipe 1' having a thickened end portion or the like.

In addition, in the metal pipe 1' having a thickened end portion according to the present embodiment, the longitudinal length $E_1$ of the one end side thickened portion 1c is 3 times or less than the outer circumferential length (not shown) in the one end side thickened portion 1c.

In a case hardness on the inner surface of the one end side thickened portion 1c of the metal pipe 1' having a thickened end portion according to the present embodiment is measured in the circumferential direction and the hardness is plotted with respect to the position in the circumferential direction, a waveform representing the high hardness portion (not shown) in the circumferential direction and a waveform representing a portion (hereinafter, referred to as a low hardness portion) in which the hardness is less than 95% of the maximum hardness on the inner surface of the metal pipe 1' having a thickened end portion alternately appear. In addition, in the case the hardness on the inner surface of the one end side thickened portion 1c of the metal pipe 1' having a thickened end portion is measured in the circumferential direction and the hardness is plotted with respect to the position in the circumferential direction, a plurality of combinations of the waveform representing the high hardness portion (not shown) and the waveform representing the low hardness portion (not shown) appear in the circumferential direction. In addition, the hardness of the high hardness portion (not shown) and the hardness of the low hardness portion (not shown) are relatively different from each other. Accordingly, in a case where the metal pipe 1' having a thickened end portion according to the present embodiment is applied to automobile parts such as a suspension member, a torsion beam, or a shaft part (drive shaft, half shaft, or the like) of a power transmission system, it is possible to dispose the high hardness portion (not shown) of the metal pipe 1' having a thickened end portion to a portion in which high strength or high rigidity is required. Accordingly, it is possible to extend fatigue life of the automobile part.

In addition, compared to the metal pipe 1 which is thickened by uniform deformation such as simple axial pressing, since the metal pipe 1' having a thickened end portion according to the present embodiment has higher strength, it is possible to prevent the automobile part from being deformed at the time of collision of an automobile, and it is possible to extend the fatigue life.

Moreover, when the metal pipe 1' having the thickened end portion according to the present embodiment is secondarily processed, since the low hardness portion (not shown) is disposed at a portion in which cracks easily occur, cracks are not easily occurred at the time of the secondary processing, which is preferable.

(First Embodiment, Method of Manufacturing Metal Pipe 1' Having Thickened End Portion)

Next, the method of manufacturing the metal pipe 1' having a thickened end portion according to the first embodiment will be described. Since the method of manufacturing the metal pipe 1' having a thickened end portion according to the first embodiment includes a first process and a second process, first, the first process will be described.

[First Process]

Figure 4:
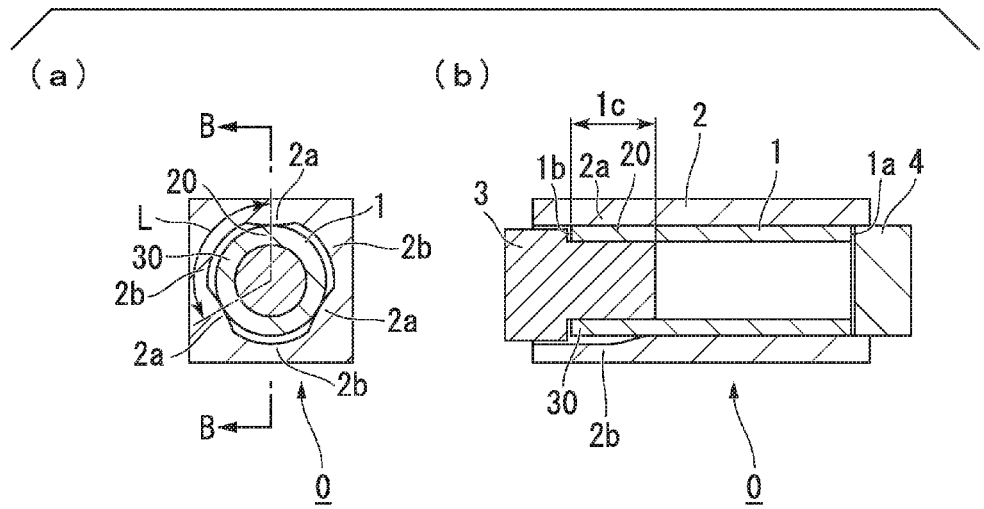
FIG. 4 is an explanatory view showing a state where a first process starts, (a) is a longitudinal sectional view on one end of a manufacturing device of a metal pipe having a thickened end portion, and (b) is a sectional view taken along line B-B in (a).

FIG. 4 is an explanatory view showing a state before a manufacturing device 0 of the metal pipe 1' having a thickened end portion, which thickens three locations on the outer circumferential surface of the metal pipe 1 to manufacture the metal pipe 1' having a thickened end portion, starts processing, (a) is a longitudinal sectional view on the one end 1b side of the manufacturing device 0 of the metal pipe 1' having a thickened end portion, and (b) is a sectional view taken along line B-B in (a).

As shown in FIG. 4, the manufacturing device 0 of the metal pipe 1' having a thickened end portion includes a die (first die, outer die) 2, an axial press punch (first axial press punch) 3, and a punch 4.

The metal pipe 1 which is a material of the metal pipe 1' having a thickened end portion is accommodated inside the die 2. The punch 4 positions the other end 1a of the metal pipe 1 accommodated in the die 2 with respect to the die 2. The axial press punch 3 is inserted into the one end 1b of the metal pipe 1 accommodated in the die 2, and axially presses the one end 1b of the metal pipe 1 toward the other end 1a side.

The inner surface shapes and the inner diameters of the die 2 are different from each other according to the portion in the longitudinal direction of the die 2. In the inner surface of the die 2, the inner surfaces shape and the inner diameter of the die 2 are determined such that the inner surface of the die 2 abuts on the outer circumferential surface of the metal pipe 1 on the other end 1a side of the metal pipe 1. Meanwhile, in the inner surface of the die 2, a thickening prevention portion 2a and a thickening formation portion 2b are formed on the inner surface of the die 2 on the one end side 1b of the metal pipe 1. In the die 2 shown in FIG. 4, three thickening prevention portions 2a and three thickening formation portions 2b are formed on the inner surface of the die 2 on the one end side 1b of the metal pipe 1.

In addition, from the viewpoint of reliably preventing buckling, preferably, the inner surface of the die 2 abuts on the entire of the outer circumferential surface of the metal pipe 1 on the other end 1a side of the metal pipe 1. However, the configuration of the die 2 of the present embodiment is not limited to this. That is, a gap between the inner surface of the die 2 and the outer circumferential surface on the other end 1a side of the metal pipe 1 may be provided as long as buckling does not occur.

In the axial press punch 3, the outer surface shape and the outer diameter of the portion which is inserted into the metal pipe 1 are determined such that the portion abuts on the inner circumferential surface of the metal pipe 1. Moreover, in the axial press punch 3, the longitudinal length of the portion which is inserted into the metal pipe 1 is determined by the longitudinal length of the one end side thickened portion 1c formed in the metal pipe 1.

In each of the thickening prevention portions 2a, the inner surface of the die 2 abuts on a die abutting portion 20 on the outer circumferential surface of the metal pipe 1. Accordingly, in the thickening prevention portion 2a, the die abutting portion 20 on the outer circumferential surface of the metal pipe 1 is not thickened.

In each of the thickening formation portions 2b, the inner surface of the die 2 and a die non-abutting portion 30 on the outer circumferential surface of the metal pipe 1 do not abut on each other. Accordingly, in the thickening formation portion 2b, the die non-abutting portion 30 on the outer circumferential surface of the metal pipe 1 is thickened.

In order to prevent buckling, preferably, the minimum distance between the inner surface of the thickening prevention portion 2a and the die abutting portion 20 on the outer circumferential surface of the metal pipe 1 exceeds 0 and is 0.1 times or less than the thickness $t_0$ of the metal pipe 1. Moreover, in order to prevent buckling, preferably, the minimum distance between the outer surface of the axial press punch 3 and the inner surface of the metal pipe 1 exceeds 0 and is 0.3 times or less than the thickness $t_0$ of the metal pipe 1.

In a case where a plurality of thickening prevention portions 2a are formed on the inner surface of the die 2, in order to prevent buckling, preferably, the center-to-center distance L in the circumferential direction of the die inner surface between two adjacent thickening prevention portions 2a is 3 times or more and 20 times or less than the thickness $t_0$ of the metal pipe 1.

Configurations other than the above-described configurations of each of the die (outer die) 2, the axial press punch 3, and the punch 4 are not particularly limited.

As described above, the axial press punch 3 is axially pressed toward the other end 1a side of the metal pipe 1 in a state where the metal pipe 1, the die 2, the axial press punch 3, and the punch 4 are disposed. Accordingly, the metal pipe 1 is compressed in the longitudinal direction.

According to the method of manufacturing the metal pipe 1' having a thickened end portion of the present embodiment, since the die abutting portion 20 on the outer circumferential surface of the metal pipe 1 abuts on the thickening prevention portion 2a of the die 2 so as to be restricted, buckling is prevented.

Figure 5:
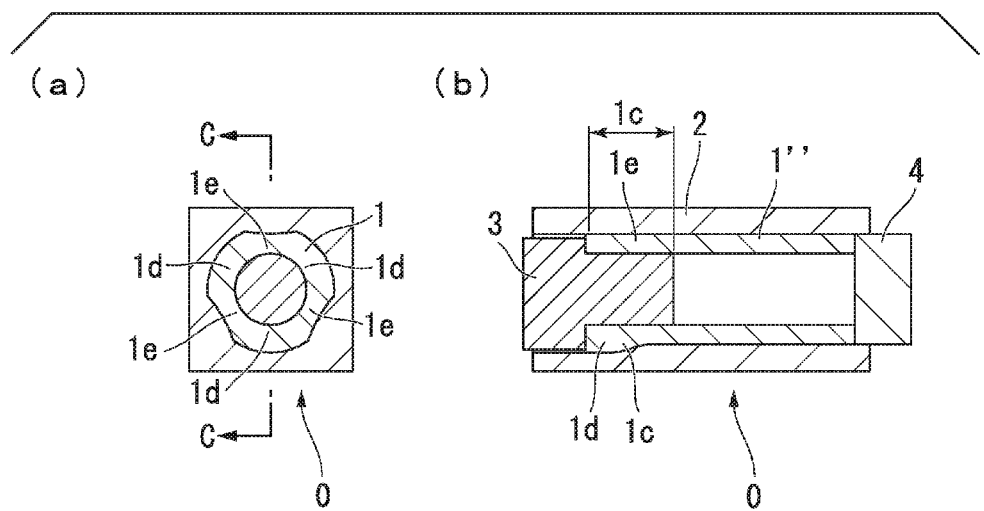
FIG. 5 is an explanatory view showing a state of the manufacturing device of the metal pipe having a thickened end portion when the first process ends, (a) is a longitudinal sectional view on one end side, and (b) is a sectional view taken along line C-C in (a).

FIG. 5 is an explanatory view showing a state of the manufacturing device 0 of the metal pipe 1' having a thickened end portion when the first process ends, (a) is a longitudinal sectional view on the one end 1b side, and (b) is a sectional view taken along line C-C in (a).

As shown in FIG. 5, in the metal pipe 1 after the first process ends, the die non-abutting portion 30 on the outer circumferential surface is thickened, and the die non-abutting portion 30 on the outer circumferential surface of the metal pipe 1 abuts on the thickening formation portion 2b of the die 2. In FIG. 5, three die non-abutting portions 30 formed on the outer circumferential surface of the metal pipe 1 are thickened.

Moreover, in the present embodiment, the metal pipe 1 after the first process is performed is referred to as an intermediate metal pipe 1".

[Second Process]

Next, in the second process, the intermediate metal pipe 1" produced in the first process is compressed in the longitudinal direction to thicken the die abutting portion 20, and the metal pipe 1' having a thickened end portion is manufactured. That is, the die non-abutting portion 30 thickened in the first process and the die abutting portion 20 thickened in the second process form the one end side thickened portion 1 c, and the metal pipe 1' having a thickened end portion is manufactured.

Figure 6:
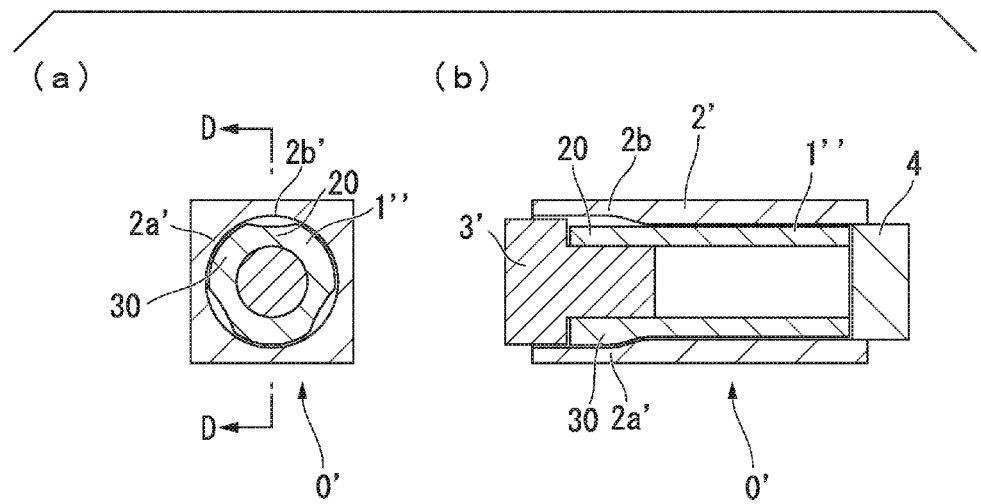
FIG. 6 is an explanatory view showing a state of the manufacturing device of the metal pipe having a thickened end portion before a second process starts, (a) is a longitudinal sectional view on one end side, and (b) is a sectional view taken along line D-D in (a).

FIG. 6 is an explanatory view showing a state of the manufacturing device 0' of the metal pipe 1' having a thickened end portion before the second process starts, (a) is a longitudinal sectional view on the one end 1b side, and (b) is a sectional view taken along line D-D in (a).

As shown in FIG. 6, in the second process, the die 2 used in the first process is replaced with a die (second die) 2', and the axial press punch 3 is replaced with an axial press punch (second axial press punch) 3'. The axial press punch 3' has an outer circumferential shape corresponding to the inner circumferential shape of the intermediate metal pipe 1".

Similarly to the first die 2, the inner surface shapes and the inner diameters of the second die 2 are different from each other according to the portion in the longitudinal direction of the second die 2'.

Similarly to the first die, in the inner surface of the second die 2', the inner surfaces shape and the inner diameter of the die 2' are determined such that the inner surface of the die 2' abuts on the outer circumferential surface of the intermediate metal pipe 1" on the other end 1a *side of the intermediate metal pipe* 1".

Meanwhile, in the inner surface of the second die 2', a thickening prevention portion 2a' and a thickening formation portion 2b' are formed on the inner surface of the die 2' on the one end side 1b of the intermediate metal pipe 1". In the second die 2' shown in FIG. 6, three thickening prevention portions 2a' and three thickening formation portions 2b' are formed on the inner surface of the second die 2' on the one end 1b side of the intermediate metal pipe 1".

In each of the thickening prevention portions 2a', the inner surface of the second die 2' abuts on the die non-abutting portion 30 on the outer circumferential surface of the intermediate metal pipe 1" thickened in the first process. Accordingly, in the second process, it is possible to prevent the die non-abutting portion 30 on the outer circumferential surface of the intermediate metal pipe 1" from being thickened.

In addition, in each of the thickening formation portions 2b', the inner surface of the second die 2' does not abut on the die abutting portion 20 on the outer circumferential surface of the intermediate metal pipe 1". Accordingly, in the second process, it is possible to thicken the die abutting portion 20 on the outer circumferential surface of the metal pipe 1.

In this way, in the second process, the die abutting portion 20 which is not thickened in the first process is thickened. At this time, since the die non-abutting portion 30 thickened in the first process abuts on the thickening prevention portion 2a' of the second die 2', it is possible to prevent buckling of the intermediate metal pipe 1".

In addition, the die non-abutting portion 30 thickened in the first process corresponds to the low hardness portion (not shown) of the metal pipe 1' having a thickened end portion, and the die abutting portion 20 thickened in the second process corresponds to the high hardness portion (not shown) of the metal pipe 1' having a thickened end portion. The die abutting portion 20 is not thickened in the first process. However, it is considered that the nature of the die abutting portion 20 is changed by a force generated when the axial press punch 3 is axially pressed and the hardness of the die abutting portion 20 when the die abutting portion 20 is thickened in the second process is increased by the change of the nature.

Figure 7:
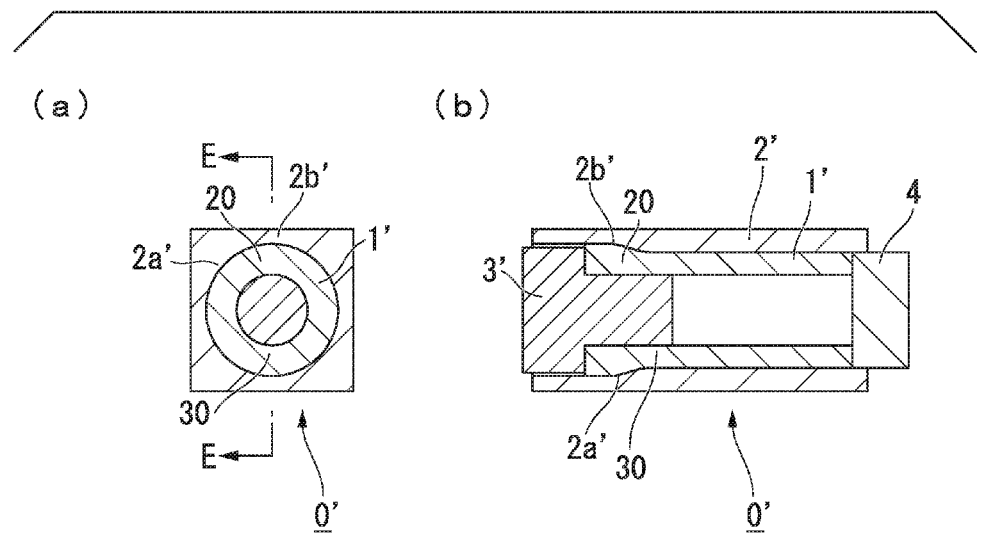
FIG. 7 is an explanatory view showing a state of the manufacturing device of the metal pipe having a thickened end portion when the second process ends, (a) is a longitudinal sectional view on one end side, and (b) is a sectional view taken along line E-E in (a).

FIG. 7 is an explanatory view showing a state of the manufacturing device 0' of the metal pipe 1' having a thickened end portion when the second process ends, (a) is a longitudinal sectional view on one end 1b side, and (b) is a sectional view taken along line E-E in (a).

As shown in FIG. 7, the second process is performed on the intermediate metal pipe 1", and it is possible to manufacture the metal pipe 1' having a thickened end portion in which the one end 1b side is thickened.

When the metal pipe 1' having a thickened end portion was manufactured in the related art, in a case where the thickness increase ratio was 1.4 or more, buckling occurred. Meanwhile, according to the method of manufacturing the metal pipe 1' having a thickened end portion of the present embodiment, even in a case where the thickness increase ratio is 1.4 or more, it is possible to manufacture the metal pipe 1' having a thickened end portion without occurring buckling. According to the method of manufacturing the metal pipe 1' having a thickened end portion of the present embodiment, even when the thickness increase ratio is 2.0 or more, it is possible to manufacture the metal pipe 1' having a thickened end portion without occurring buckling.

Moreover, the method of manufacturing the metal pipe 1' having a thickened end portion of the present embodiment, the first process and the second process are performed in cold.

(Second Embodiment, Metal Pipe 201' Having Thickened End Portion)

Next, a metal pipe 201' having a thickened end portion according to a second embodiment will be described.

Figure 8:
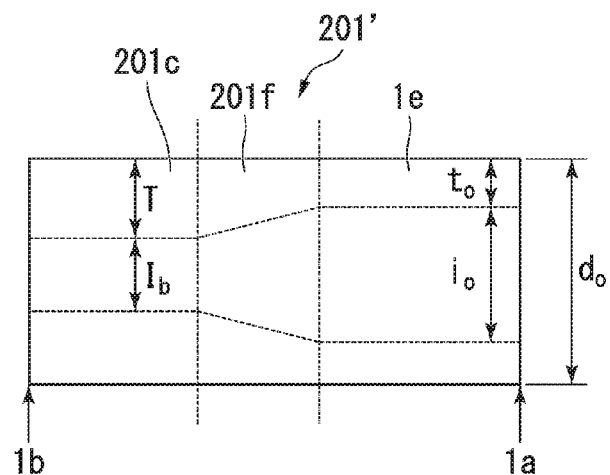
FIG. 8 is a schematic view showing a metal pipe having a thickened end portion according to a second embodiment when viewed in a longitudinal direction.

FIG. 8 is a schematic view showing the metal pipe 201' having a thickened end portion according to the second embodiment. In the metal pipe 201' having a thickened end portion shown in FIG. 2, the outer diameter $D_b$ on the one end 1b side of the metal pipe 1' having a thickened end portion is larger than the outer diameter $d_0$ on the other end 1a side while the inner diameter $i_0$ of the metal pipe 1' having a thickened end portion in the entire longitudinal direction is constant. Meanwhile, in the metal pipe 201' having a thickened end portion according to the second embodiment shown in FIG. 8, an inner diameter $I_b$ on the one end 1b side of the metal pipe 201' having a thickened end portion is smaller than an inner diameter $i_0$ on the other end 1a side while an outer diameter $d_0$ of the metal pipe 201' having a thickened end portion in the entire longitudinal direction is constant, and the thickness T on the one end 1b side is configured to be larger than the thickness $t_0$ on the other end 1a side. That is, the metal pipe 201' having a thickened end portion has one end side thickened portion 201c in which the thickness is T.

Moreover, detail descriptions with respect to portions having configurations similar to those of the metal pipe 1' having a thickened end portion according to the first embodiment are omitted.

Similarly to the metal pipe 1' having a thickened end portion, the metal pipe 201' having a thickened end portion is manufactured with the metal pipe 1 as a material. Since the metal pipe 1 is similar to that of the first embodiment, descriptions thereof are omitted.

The thickness T of the metal pipe 201' having a thickened end portion on the one end 1b side is larger than the thickness $t_0$ on the other end 1a side. Moreover, the inner diameter $I_b$ of the metal pipe 201' having a thickened end portion on the one end 1b side is smaller than the inner diameter $i_0$ on the other end 1a side. Moreover, the outer diameter $d_0$ of the metal pipe 201' having a thickened end portion is constant in the entire longitudinal direction of the metal pipe 201' having a thickened end portion.

In addition, the metal pipe 201' having a thickened end portion has a taper portion 201f in which the thickness gradually increases from $t_0$ to $T_a$ between the one end side thickened portion 201c and the thin portion 1e.

(Second Embodiment, Method of Manufacturing Metal Pipe 201' Having Thickened End Portion)

Next, a method of manufacturing the metal pipe 201' having a thickened end portion according to the second embodiment will be described. Since the method of manufacturing the metal pipe 201' having a thickened end portion according to the second embodiment includes a first process and a second process, first, the first process will be described.

[First Process]

Figure 9:
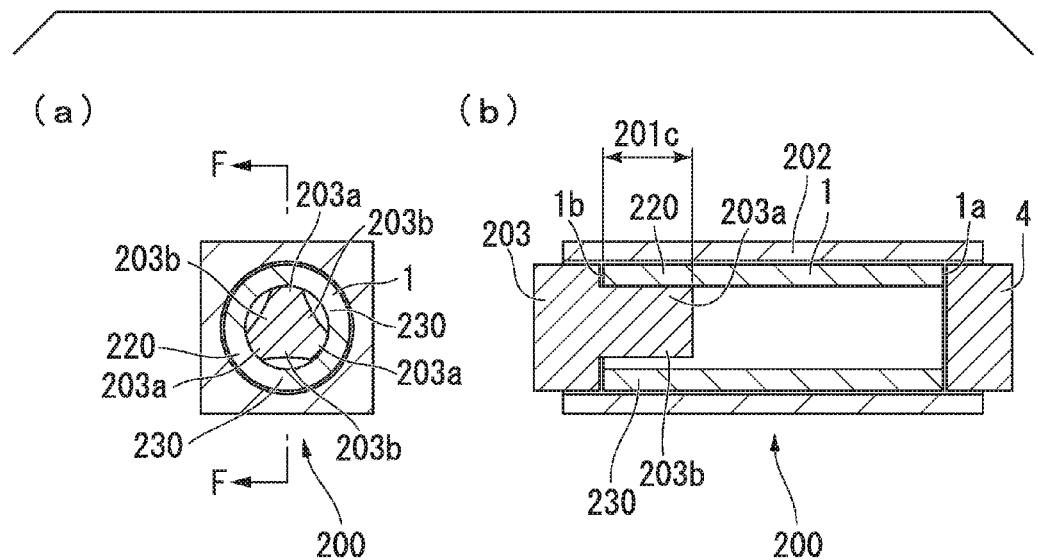
FIG. 9 is an explanatory view showing a state of a manufacturing device of the metal pipe having a thickened end portion according to the second embodiment before thickening is performed, (a) is a longitudinal sectional view on one end side, and (b) is a sectional view taken along line F-F in (a).

FIG. 9 is an explanatory view showing a state of a manufacturing device 200 of the metal pipe 201' having a thickened end portion according to the second embodiment before thickening is performed, (a) is a longitudinal sectional view on one end 1b side, and (b) is a sectional view taken along line F-F in (a).

As shown in FIG. 9, the manufacturing device 200 of the metal pipe 201' having a thickened end portion includes a die (outer die) 202, an axial press punch (first axial press punch) 203, and the punch 4.

In the die 2 according to the first embodiment, the inner surface shape and the inner diameter are determined such that the inner surface of the metal pipe 1 on the other end 1a side abuts on the outer circumferential surface of the metal pipe 1, and the thickening prevention portion 2a and the thickening formation portion 2b are formed on the inner surface on the one end 1b side. Meanwhile, in the die 202 according to the second embodiment, the thickening prevention portion 2a and the thickening formation portion 2b are not formed, and the inner surface shape and the inner diameter are determined such that the inner surface abuts on the outer circumferential surface of the metal pipe 1 in the entire longitudinal direction of the die 202.

In the axial press punch 3 according to the first embodiment, the outer surface shape and the outer diameter of the portion which is inserted into the metal pipe 1 are determined such that the portion abuts on the inner circumferential surface of the metal pipe 1, and the longitudinal length of the portion which is inserted into the metal pipe 1 is determined by the longitudinal length of the one end side thickened portion 1c formed in the metal pipe 1.

Meanwhile, the axial press punch (first axial press punch) 203 according to the second embodiment is similar to the axial press punch 3 according to the first embodiment in that the longitudinal length of the portion which is inserted into the metal pipe 1 is determined by the longitudinal length of the one end side thickened portion 201c formed in the metal pipe 1. However, the axial press punch 203 according to the second embodiment is different from the axial press punch 3 according to the first embodiment in that a thickening prevention portion 203a and a thickening formation portion 203b are formed on the outer surface of the portion of the axial press punch 203 according to the second embodiment which is inserted into the metal pipe 1.

The axial press punch 203 abuts on the inside of the one end 1b of the metal pipe 1 accommodated inside the die 202 to be inserted into the metal pipe 1, and axially presses the one end 1b of the metal pipe 1 toward the other end 1a. In this way, the manufacturing device 200 of the metal pipe 201' having a thickened end portion compress the metal pipe 1 in the longitudinal direction, and one end side thickened portion 201c is formed on the inner circumferential surface of the metal pipe 1 in a portion on the one end 1b side of the metal pipe 1.

The axial press punch 203 shown in FIG. 9 includes three thickening prevention portions 203a and three thickening formation portions 203b on the inner surface of a portion inserted into the metal pipe 1.

In each of the thickening prevention portions 203a, the outer circumferential surface of the axial press punch 203 abuts on an axial press punch abutting portion 220 on the inner circumferential surface of the metal pipe 1. Accordingly, in the thickening prevention portion 203a, the inner circumferential surface of the metal pipe 1 is not thickened.

Meanwhile, in each of the thickening formation portions 203b, the outer circumferential surface of the axial press punch 203 does not abut on an axial press punch non-abutting portion 230 on the inner circumferential surface of the metal pipe 1. Accordingly, in the thickening formation portion 203b, the axial press punch non-abutting portion 230 on the inner circumferential surface of the metal pipe 1 is thickened.

In order to prevent buckling, preferably, the minimum distance between the inner circumferential surface of the die 202 and the outer circumferential surface of the metal pipe 1 exceeds 0 and is 0.1 times or less than the thickness $t_0$ of the metal pipe 1. Moreover, in order to prevent buckling, preferably, the minimum distance between the outer circumferential surface of the axial press punch 203 and the inner circumferential surface of the metal pipe 1 exceeds 0 and is 0.3 times or less than the thickness $t_0$ of the metal pipe 1.

In order to prevent buckling, preferably, a distance L in the circumferential direction of the outer surface of the axial press punch between two adjacent thickening prevention portions 203a is 3 times or more and 20 times or less than the thickness $t_0$ of the metal pipe 1.

Configurations other than the above-described configurations of each of the die (outer die) 202, the axial press punch 203, and the punch 4 are not particularly limited.

As described above, the axial press punch 203 is axially pressed toward the other end 1a side of the metal pipe 1 in a state where the metal pipe 1, the die 202, the axial press punch 203, and the punch 4 are disposed. Accordingly, the metal pipe 1 is compressed in the longitudinal direction.

According to the method of manufacturing the metal pipe 201' having a thickened end portion of the present embodiment, since the axial press punch abutting portion 220 on the inner circumferential surface of the metal pipe 1 abuts on the thickening prevention portion 203a of the axial press punch 203 so as to be restricted, buckling is prevented.

Figure 10:
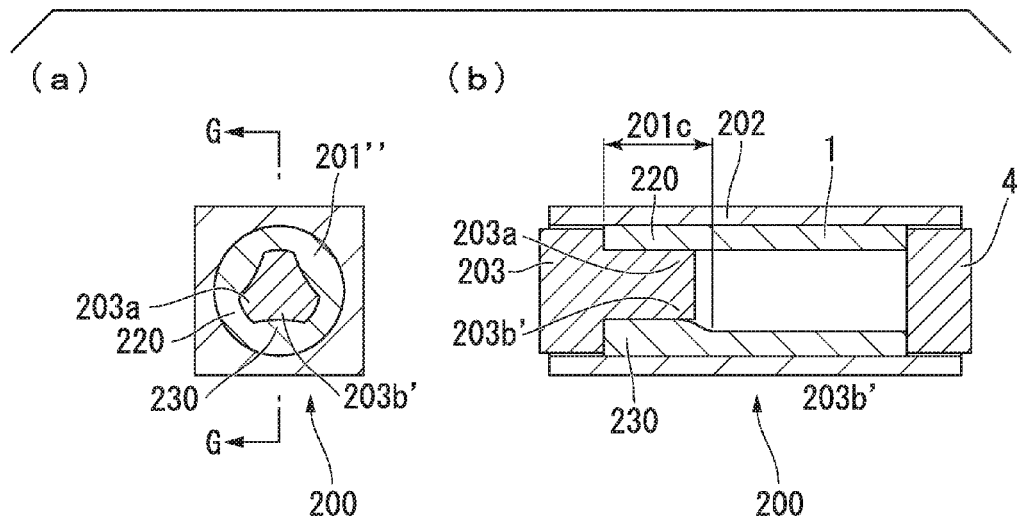
FIG. 10 is an explanatory view showing the state of the manufacturing device of the metal pipe having a thickened end portion when a first process ends, (a) is a longitudinal sectional view on one end side, and (b) is a sectional view taken along line G-G in (a).

FIG. 10 is an explanatory view showing a state of the manufacturing device 200 of the metal pipe 201' having a thickened end portion when the first process ends, (a) is a longitudinal sectional view on the one end 1b side, and (b) is a sectional view taken along line G-G in (a).

As shown in FIG. 10, in the metal pipe 1 after the first process ends, the axial press punch non-abutting portion 230 is thickened, and the axial press punch non-abutting portion 230 on the inner circumferential surface of the metal pipe 1 abuts on the thickening formation portion 203b of the axial press punch 203. In FIG. 10, three axial press punch non-abutting portions 230 formed on the inner circumferential surface of the metal pipe 1 are thickened.

Moreover, the metal pipe 1 after the first process is performed is referred to as an intermediate metal pipe 201".

[Second Process]

Next, in the second process, the intermediate metal pipe 201" produced by the first process is compressed in the longitudinal direction to thicken the axial press punch abutting portion 220, and the metal pipe 201' having a thickened end portion is manufactured. That is, the axial press punch non-abutting portion 230 thickened by the first process and the axial press punch abutting portion 220 thickened in the second process form the one end side thickened portion 201c, and the metal pipe 201' having a thickened end portion is manufactured.

Figure 11:
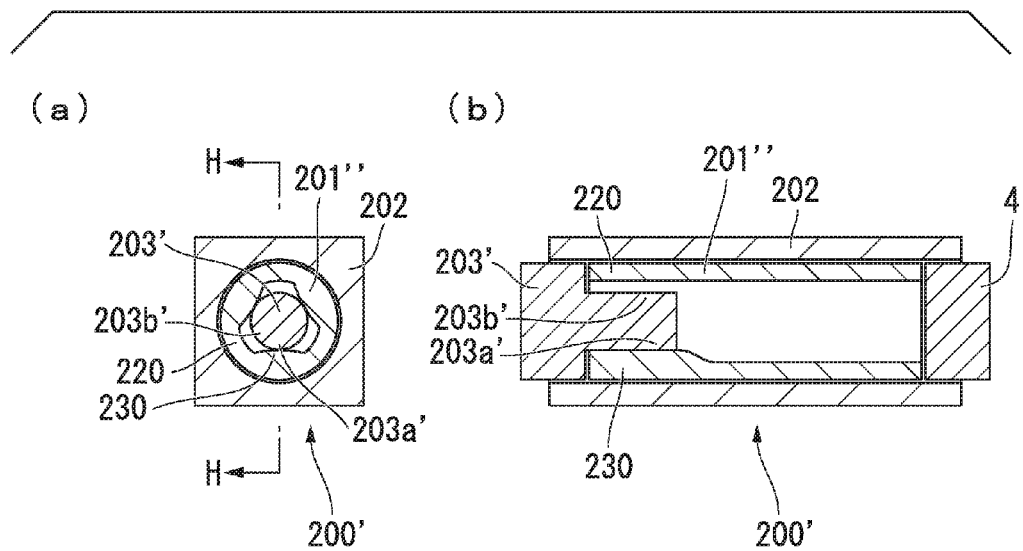
FIG. 11 is an explanatory view showing the state of the manufacturing device of the metal pipe having a thickened end portion before a second process starts, (a) is a longitudinal sectional view on one end side, and (b) is a sectional view taken along line H-H in (a).

FIG. 11 is an explanatory view showing a state of the manufacturing device 200' of the metal pipe 201' having a thickened end portion before the second process starts, (a) is a longitudinal sectional view on the one end 1b side, and (b) is a sectional view taken along line H-H in (a).

As shown in FIG. 11, the second process is similar to the first process in that the die 202 is used. However, the axial press punch 203 used in the first process is replaced with an axial press punch (second axial press punch) 203'.

The intermediate metal pipe 201" is disposed in the die 202 such that the entire of the outer circumferential surface of the intermediate metal pipe 201" abuts on the inner surface of the die 202.

The second axial press punch 203 includes a thickening prevention portion 203a' and a thickening formation portions 203b' on the inner surface of a portion inserted into the metal pipe 1. The thickening prevention portion 203a' of the second axial press punch 203' abuts on the axial press punch non-abutting portion 230 of the intermediate metal pipe 201". Accordingly, in the second process, it is possible to prevent the axial press punch non-abutting portion 230 on the inner circumferential surface of the intermediate metal pipe 201" from being thickened.

In addition, the thickening formation portion 203b' of the second axial press punch 203' does not abut on the axial press punch abutting portion 220 of the intermediate metal pipe 201". Accordingly, in the second process, it is possible to thicken the axial press punch abutting portion 220 on the inner circumferential surface of the intermediate metal pipe 201".

In this way, in the second process, the axial press punch abutting portion 220 which is not thickened in the first process is thickened. At this time, since the axial press punch non-abutting portion 230 thickened in the first process abuts on the thickening prevention portion 203a' of the second axial press punch 203', it is possible to prevent buckling of the intermediate metal pipe 201".

Figure 12:
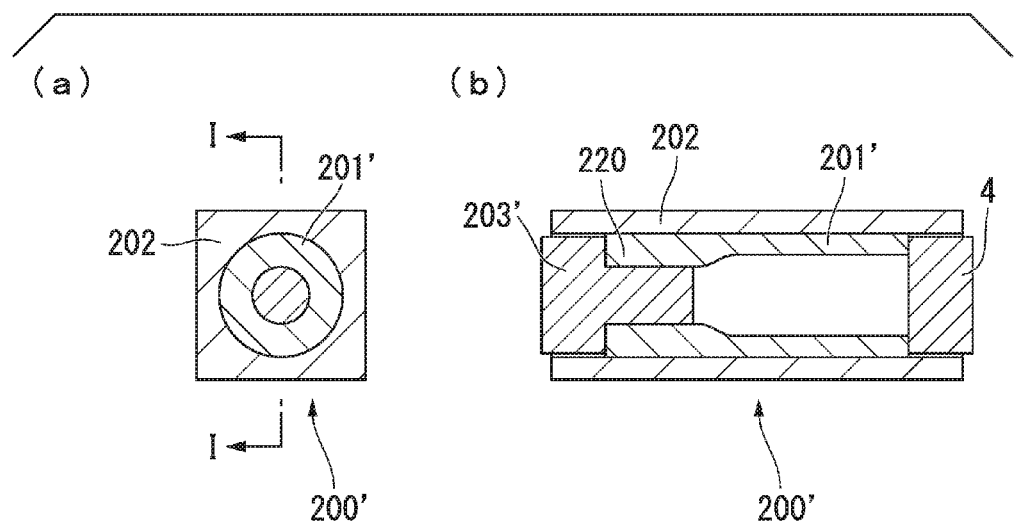
FIG. 12 is an explanatory view showing the state of the manufacturing device of the metal pipe having a thickened end portion when the second process ends, (a) is a longitudinal sectional view on one end side, and (b) is a sectional view taken along line I-I in (a).

FIG. 12 is an explanatory view showing a state of the manufacturing device 200' of the metal pipe 201' having a thickened end portion when the second process ends, (a) is a longitudinal sectional view on one end 1b side, and (b) is a sectional view taken along line I-I in (a).

As shown in FIG. 12, the second process is performed on the intermediate metal pipe 201", and it is possible to manufacture the metal pipe 201' having a thickened end portion in which the one end 1b side is thickened.

When the metal pipe 201' having a thickened end portion was manufactured in the related art, in a case where the thickness increase ratio was 1.4 or more, buckling occurred. Meanwhile, according to the method of manufacturing the metal pipe 201' having a thickened end portion of the present embodiment, even in a case where the thickness increase ratio is 1.4 or more, it is possible to manufacture the metal pipe 201' having a thickened end portion without occurring buckling. According to the method of manufacturing the metal pipe 201' having a thickened end portion of the present embodiment, even when the thickness increase ratio is 2.0 or more, it is possible to manufacture the metal pipe 201' having a thickened end portion without occurring buckling.

(Second Embodiment, Modification Example)

In the method of manufacturing the metal pipe 201' having a thickened end portion according to the present embodiment, the metal pipe 201' having a thickened end portion may be manufactured in a state where an internal pressure is applied to the metal pipe 1.

Figure 13:
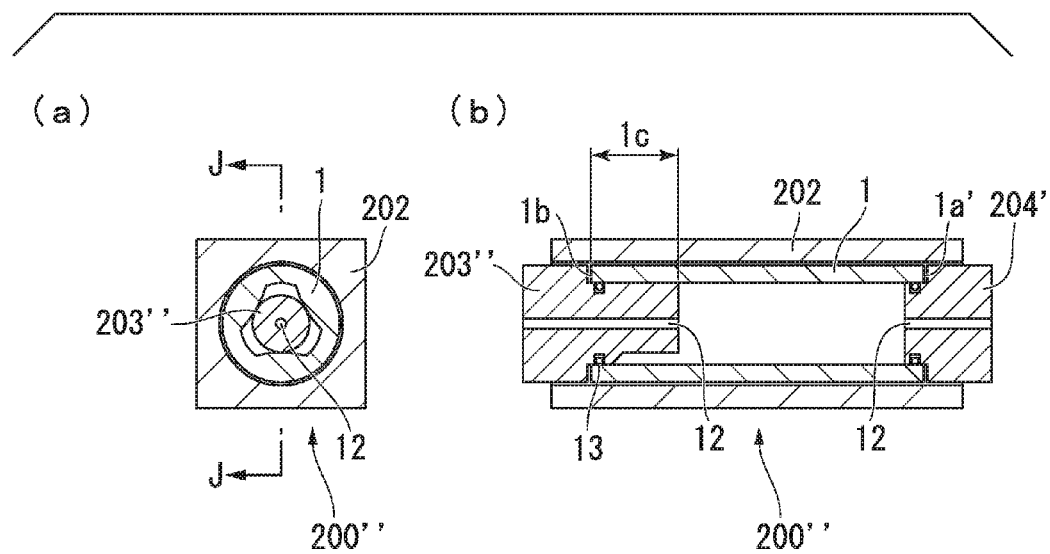
FIG. 13 is an explanatory view showing a positional relationship between a manufacturing device of a metal pipe having a thickened end portion according to a modification example of the second embodiment and a metal pipe before thickening is performed, (a) is a longitudinal sectional view on one end side, and (b) is a sectional view taken along line J-J in (a).

FIG. 13 is an explanatory view showing a manufacturing device 200" of manufacturing the metal pipe 201' having a thickened end portion in a state where an internal pressure is applied to the metal pipe 1, (a) is a longitudinal sectional view of the manufacturing device 200" of the metal pipe 201' having a thickened end portion, and (b) is a sectional view taken along line J-J in (a).

As shown in FIG. 13, in manufacturing device 200" of the metal pipe 201' having a thickened end portion, water paths 12 through which a pressure medium is injected into the metal pipe 1 are formed in a punch 204' and an axial press punch 203". In the punch 203", an inner surface of the pipe end is sealed by a seal member 13. It is possible to use an O-ring, a metal seal, or the like as the seal member 13.

As shown in FIG. 13, an internal pressure is applied to the metal pipe 1 by injecting the pressure medium into the metal pipe 1. Accordingly, when the metal pipe 1 is axially pressed from the one end 1b side toward the other end 1a side using the axial press punch 203", it is possible to prevent buckling on the inner circumferential surface side of the metal pipe 1.

Preferably, as the pressure medium, a liquid is used, and for example, water is used.

(Third Embodiment, Metal Pipe 301' Having Thickened End Portion)

Next, a metal pipe 301' having a thickened end portion according to a third embodiment will be described.

Figure 14:
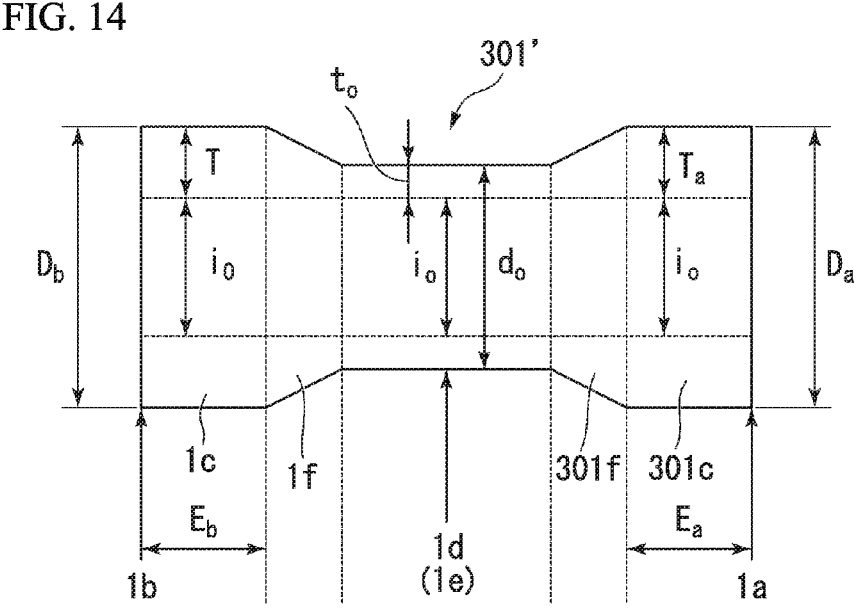
FIG. 14 is a schematic view showing a metal pipe having a thickened end portion according to a third embodiment when viewed in a longitudinal direction.

FIG. 14 is a schematic view showing the metal pipe 301' having a thickened end portion according to the third embodiment. In the metal pipe 1' having a thickened end portion shown in FIG. 2, the outer diameter $D_b$ on the one end 1b side is larger than the outer diameter $d_0$ on the other end 1a side. In the metal pipe 301' having a thickened end portion shown in FIG. 14, the configuration on the one end 1b side is similar to that of the metal pipe 1' having a thickened end portion. Meanwhile, in the metal pipe 301' having a thickened end portion, the configuration on the other end 1a side is different from that of the metal pipe 1' having a thickened end portion, and an outer diameter $D_a$ on the other end 1a side is larger than an outer diameter $d_0$ of a center portion 1d in the longitudinal direction. That is, the metal pipe 301' having a thickened end portion includes the other end side thickened portion (second thickened portion) 301c on the other end 1a side in addition to the one end side thickened portion 1c.

In addition, the metal pipe 301' having a thickened end portion includes a taper portion (second taper portion) 301f, in which the thickness gradually increases from $t_0$ to $T_a$ is formed, between the thin portion 1e and the other end side thickened portion 301c.

Moreover, detail descriptions with respect to portions having configurations similar to those of the metal pipe 1' having a thickened end portion according to the first embodiment and the metal pipe 201' having a thickened end portion according to a second embodiment are omitted.

Similarly to the metal pipe 1' having a thickened end portion and the metal pipe 201' having a thickened end portion, the metal pipe 301' having a thickened end portion is manufactured with the metal pipe 1 as a material. Since the metal pipe 1 is similar to those of the first embodiment and the second embodiment, descriptions thereof are omitted.

The thickness T of the one end side thickened portion 1c and the thickness $T_a$ of the other end side thickened portion 301c in the metal pipe 301' having a thickened end portion are larger than the thickness $t_0$ of the center portion 1d (thin portion 1e). In addition, as described above, the outer diameter $D_b$ of the one end side thickened portion 1c and the outer diameter $D_a$ of the other end side thickened portion 301c in the metal pipe 301' having a thickened end portion are larger than the outer diameter $d_0$ in the center portion 1d (thin portion 1e). Meanwhile, in the metal pipe 301' having a thickened end portion, the inner diameter of the one end side thickened portion 1c, the inner diameter of the other end side thickened portion 301c, and the inner diameter of the center portion 1d (thin portion 1e) are $i_0$, and have the same size as each other.

Preferably, $T_a/t_0$ is 1.2 or more, which is a ratio (the thickness increase ratio) obtained by dividing the thickness $T_a$ of the other end side thickened portion 301c by the thickness $t_0$ of the center portion 1d (the thin portion 1e).

More preferably, $T_a/t_0$ is 1.4 or more, and still more preferably, $T_a/t_0$ is 2.0 or more.

In the metal pipe 301' having a thickened end portion, the thickness T of the one end side thickened portion 1c and the thickness $T_a$ of the other end side thickened portion 301c may be the same as each other, or may be different from each other. That is, in the metal pipe 301' having a thickened end portion, the outer diameter $D_b$ of the one end side thickened portion 1c and the outer diameter $D_a$ of the other end side thickened portion 301c may be the same as each other, or may be different from each other.

Moreover, in the metal pipe 301' having a thickened end portion, the longitudinal length $E_b$ of the one end side thickened portion 1c and the longitudinal length $E_a$ of the other end side thickened portion 301c may be the same as each other, or may be different from each other.

In the metal pipe 301' having a thickened end portion, the longitudinal length $E_b$ of the one end side thickened portion 1c is 3 times or less than the outer circumferential length (not shown) of the one end side thickened portion 1c. Moreover, in the metal pipe 301' having a thickened end portion, the longitudinal length $E_a$ of the other end side thickened portion 301c is 3 times or less than the outer circumferential length (not shown) of the other end side thickened portion 301c.

The other end side thickened portion 301c is similar to the one end side thickened portion 1c in that the high hardness portion (not shown) and the low hardness portion (not shown) are alternately provided in the circumferential direction.

(Third Embodiment, Method of Manufacturing Metal Pipe 301' Having Thickened End Portion)

Next, a method of manufacturing the metal pipe 301' having a thickened end portion according to the third embodiment will be described. Since the method of manufacturing the metal pipe 301' having a thickened end portion according to the third embodiment includes a first process and a second process, first, the first process will be described.

[First Process]

Figure 15:
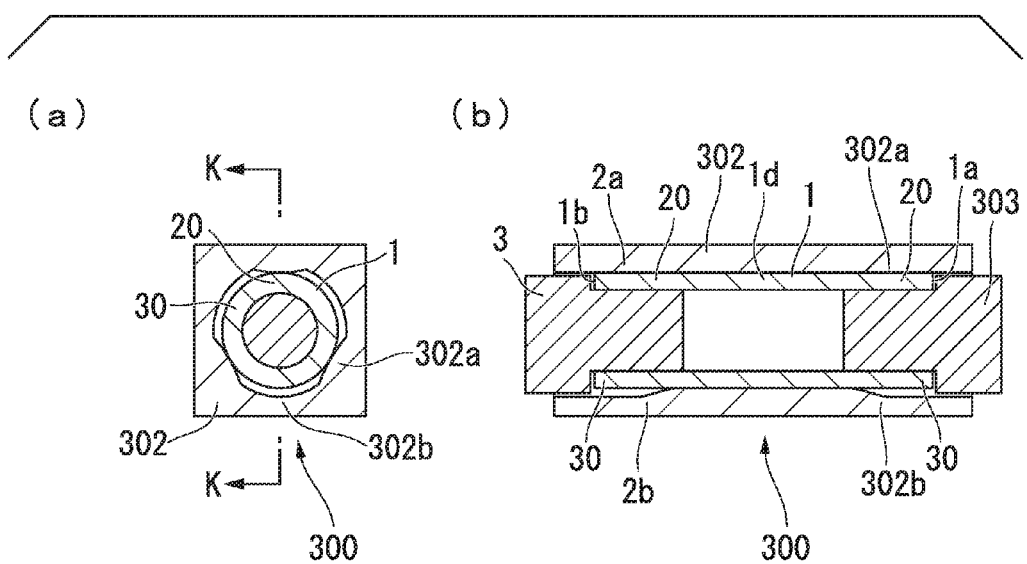
FIG. 15 is an explanatory view showing a state of a manufacturing device of the metal pipe having a thickened end portion according to the third embodiment before thickening is performed, (a) is a longitudinal sectional view on the other end side of a metal pipe, and (b) is a sectional view taken along line K-K in (a).

FIG. 15 is an explanatory view showing a state of a manufacturing device 300 of the metal pipe 301' having a thickened end portion according to the third embodiment before thickening is performed, (a) is a longitudinal sectional view on the other end 1a side of the metal pipe 1, and (b) is a sectional view taken along line K-K in (a).

As shown in FIG. 15, the manufacturing device 300 of the metal pipe 301' having a thickened end portion includes a die (outer die) 302, an axial press punch (first axial press punch) 3 which is used on the one end 1b side of the metal pipe 1, and an axial press punch (third axial press punch) 303 which is used on the other end 1a side of the metal pipe 1.

In the manufacturing device 0 of the metal pipe 1' having a thickened end portion according to the first embodiment, the axial press punch 3 is inserted into the inner surface on the one end 1b side of the metal pipe 1, and the punch 4 is inserted into the inner surface on the other end 1a side. Meanwhile, in the manufacturing device 300 of the metal pipe 301' having a thickened end portion according to the third embodiment, the axial press punch 3 is inserted into the inner surface on the one end 1b side of the metal pipe 1, and the axial press punch 303 is inserted into the other end 1a side.

In addition, in the die 2 according to the first embodiment, the thickening prevention portion 2a and the thickening formation portion 2b are formed on only the one end 1b side of the metal pipe 1. Meanwhile, in the die (first die) 302 according to the third embodiment, in addition to the thickening prevention portion 2a and the thickening formation portion 2b being formed on the one end 1b side of the metal pipe 1, the thickening prevention portion 312a and the thickening formation portion 312b are formed on the other end 1a side.

The configuration on the one end 1b side of the die 302 according to the third embodiment is similar to the configuration on the one end 1b side of the die 2 according to the first embodiment.

Meanwhile, the configuration on the other end 1a side of the die 302 is different from the configuration on the one end 1b side of the die 2, and a thickening prevention portion 302a and a thickening formation portion 302b are formed.

In the die 302 shown in FIG. 15, three thickening prevention portions 2a and three thickening formation portions 2b are formed on the one end 1b side of the metal pipe 1, and three thickening prevention portions 302a and three thickening formation portions 302b are formed on the other end 1a side.

In the axial press punches 3 and 303 according to the third embodiment, the outer surface shape and the outer diameter of the portion inserted into the metal pipe 1 are determined such that the portion abuts on the inner circumferential surface of the metal pipe 1.

As described above, the axial press punch 3 is axially pressed toward the other end 1a side of the metal pipe 1 and the axial press punch 303 is axially pressed toward the one end 1b side of the metal pipe 1 in a state where the metal pipe 1, the die 302, the axial press punches 3 and 303 are disposed. Accordingly, the metal pipe 1 is compressed in the longitudinal direction.

Figure 16:
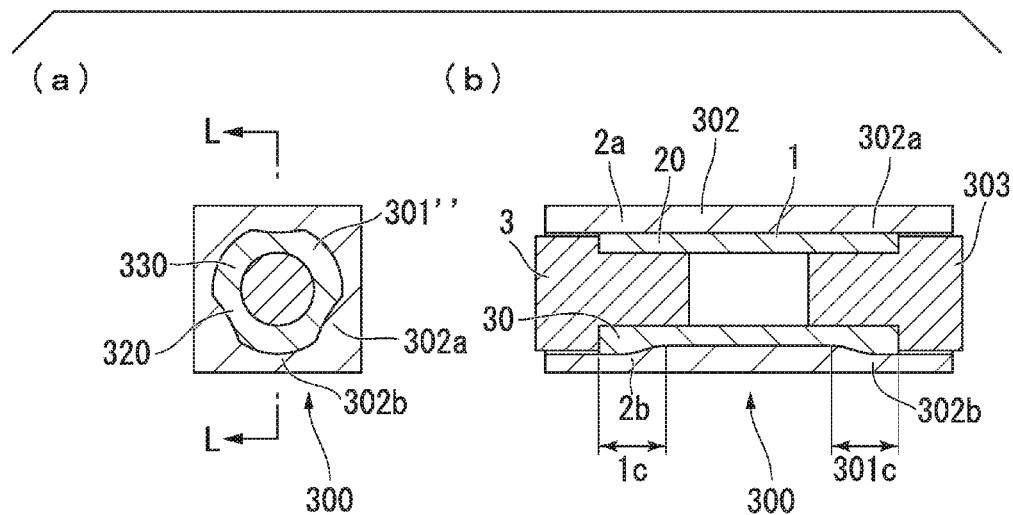
FIG. 16 is an explanatory view showing the state of the manufacturing device of the metal pipe having a thickened end portion when a first process ends, (a) is a longitudinal sectional view on the other end side, and (b) is a sectional view taken along line L-L in (a).

FIG. 16 is an explanatory view showing the state of the manufacturing device 300 of the metal pipe 301' having a thickened end portion when the first process ends, FIG. 16 is a longitudinal sectional view on the other end 1a side, and (b) is a sectional view taken along line L-L in (a).

Similarly to the first embodiment, as shown in FIG. 16, it is possible to thicken the die non-abutting portion 30 of the metal pipe 1 on the one end 1b side of the metal pipe 1 by the first process of the present embodiment. Moreover, it is possible to thicken the die non-abutting portion 30 of the metal pipe 1 on the other end 1a side of the metal pipe 1 by the first process of the present embodiment. That is, it is possible to form the one end side thickened portion 1c on the one end 1b side of the metal pipe 1 and form the other end side thickened portion 301c on the other end 1a side by the first process of the present embodiment.

In this case, since the die abutting portions 20 on the one end 1b side and the other end 1a side of the metal pipe 1 abut on the thickening prevention portion 2a of the die 2 and the thickening prevention portion 302a of the die 302 so as to be restricted, buckling is prevented.

In addition, in the present embodiment, the metal pipe 1 after the first process is performed is referred to as an intermediate metal pipe 301".

[Second Process]

Next, in the second process, the intermediate metal pipe 301" produced in the first process is compressed in the longitudinal direction from the one end 1b side and the other end 1a side to thicken the die abutting portion 20, and the metal pipe 301' having a thickened end portion is manufactured. That is, the die non-abutting portion 30 thickened in the first process and the die abutting portion 20 thickened in the second process form on the one end side thickened portion 1c and the other end side thickened portion 301c, and the metal pipe 301' having a thickened end portion is manufactured.

Figure 17:
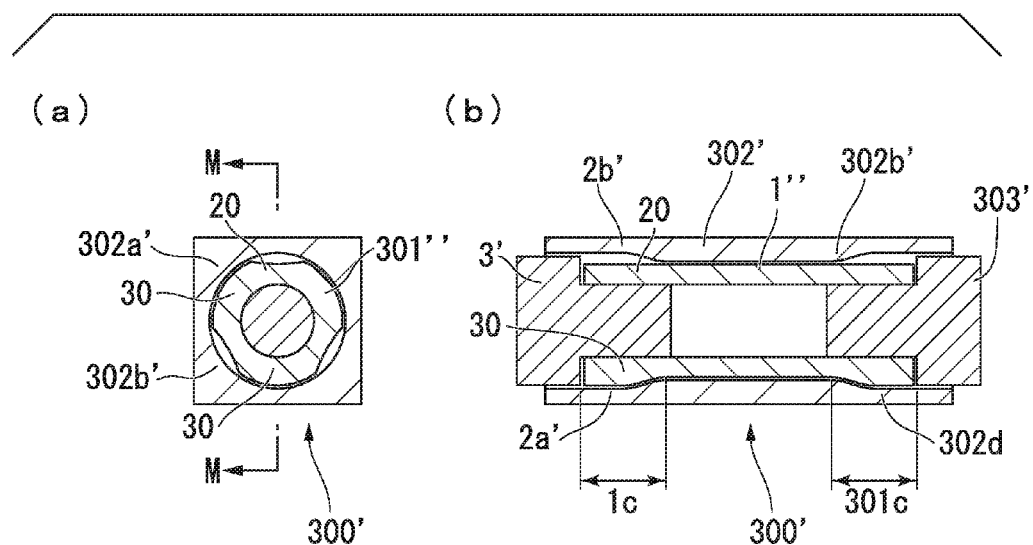
FIG. 17 is an explanatory view showing the state of the manufacturing device of the metal pipe having a thickened end portion before a second process starts, (a) is a cross sectional view in a longitudinal direction on the other end side, and (b) is a sectional view taken along line M-M in (a).

FIG. 17 is an explanatory view showing the state of a manufacturing device 300' of the metal pipe 301' having a thickened end portion before the second process starts, (a) is a cross sectional view in a longitudinal direction on the other end 1a side, and (b) is a sectional view taken along line M-M in (a).

In the second process of the first embodiment, the die 2', the axial press punch 3', and the punch 4 are used. However, in the second process of the present embodiment, as shown in FIG. 17, a die (second die) 302', an axial press punch (second axial press punch) 3' and an axial press punch (fourth axial press punch) 303' are used.

The die 302' according to the present embodiment and the die 2' according to the first embodiment have the same configuration as each other on the one end 1b side. Meanwhile, the die 302' according to the present embodiment is different from the die 2' according to the first embodiment, and a thickening prevention portion 302a' and a thickening formation portion 302b' are also formed on the other end 1a side.

In the thickening prevention portion 302a', the inner surface of the die 302' abuts on the die non-abutting portion 30 on the outer circumferential surface of the intermediate metal pipe 301". Meanwhile, in the thickening formation portion 302b', the inner surface of the die 302' does not abut on the die abutting portion 20 on the outer circumferential surface of the intermediate metal pipe 301".

Figure 18:
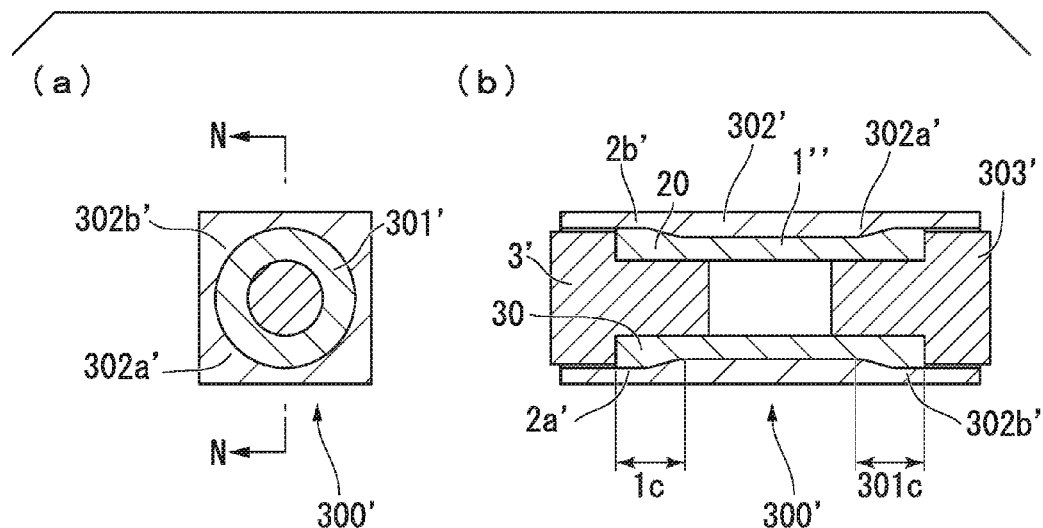
FIG. 18 is an explanatory view showing the state of the manufacturing device of the metal pipe having a thickened end portion when the second process ends, (a) is a longitudinal sectional view on the other end side, and (b) is a sectional view taken along line N-N in (a).

FIG. 18 is an explanatory view showing the state of the manufacturing device 300' of the metal pipe 301' having a thickened end portion when the second process ends, (a) is a longitudinal sectional view on the one end 1a side, and (b) is a sectional view taken along line N-N in (a).

As shown in FIG. 18, it is possible to thicken not only the die abutting portion 20 on the one end 1b side of the metal pipe 1 but also the die abutting portion 20 on the other end 1a side by the second process of the present embodiment. Accordingly, the metal pipe 301' having a thickened end portion is manufactured, in which not only the one end 1b side but also the other end 1a side are thickened.

In addition, in the first process, the case where the axial press punch 3 is used on the one end 1b side of the metal pipe 1 and the axial press punch 303 is used on the other end 1a side is described. However, in a case where the one end side thickened portion 1c (or the other end side thickened portion 301c) is formed on both ends of the metal pipe 1, the axial press punches 3 (or axial press punches 303) may be used on both the one end 1b side and the other end 1a side. Moreover, in the die 302 which is used in the first process, the case where the thickening prevention portion 2a and the thickening formation portion 2b are formed on the one end 1b side and the thickening prevention portion 302a and the thickening formation portion 302b are formed on the other end 1a side is described. However, the thickening prevention portion 2a and the thickening formation portion 2b (or the thickening prevention portion 302a and the thickening formation portion 302b) may be formed on both the one end 1b side and the other end 1a side.

Similarly, when the one end side thickened portion 1c (or the other end side thickened portion 301c) is formed on both ends of the metal pipe 1, in the second process, the case where the axial press punch 3' is used on the one end 1b side of the metal pipe 1 and the axial press punch 303' is used on the other end 1a side is described. However, the axial press punch 3' (or axial press punch 303') may be used on both the one end 1b side and the other end 1a side. In addition, in the die 302' which is used in the second process, the case where the thickening prevention portion 2a' and the thickening formation portion 2b' are formed on the one end 1b side and the thickening prevention portion 302a' and the thickening formation portion 302b' are formed on the other end 1a side is described. However, the thickening prevention portion 2a' and the thickening formation portion 2b' (or the thickening prevention portion 302a' and the thickening formation portion 302b') may be formed on both the one end 1b side and the other end 1a side.

(Fourth Embodiment, Metal Pipe 401' Having Thickened End Portion)

Next, a metal pipe 401' having a thickened end portion according to a fourth embodiment will be described.

Figure 19:
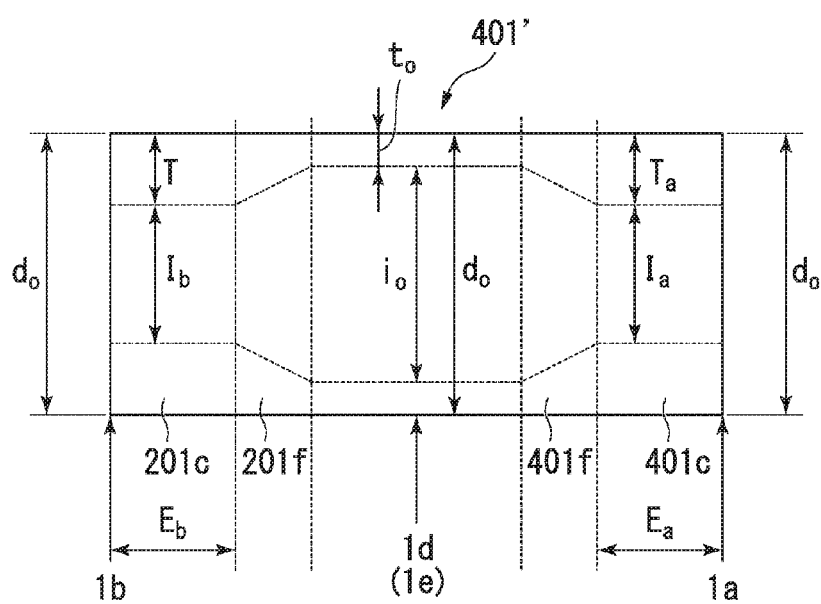
FIG. 19 is a schematic view showing a metal pipe having a thickened end portion according to a fourth embodiment when viewed in a longitudinal direction.

FIG. 19 is a schematic view showing the metal pipe 401' having a thickened end portion according to the fourth embodiment. In the metal pipe 201' having a thickened end portion shown in FIG. 8, the inner diameter $I_b$ on the one end 1b side is smaller than the inner diameter $I_0$ on the other end 1a side. In the metal pipe 401' having a thickened end portion shown in FIG. 19, the configuration on the one end 1b side is similar to that of the metal pipe 201' having a thickened end portion. Meanwhile, the configuration on the other end 1a side of the metal pipe 401' having a thickened end portion is different from that of the metal pipe 201' having a thickened end portion, and the inner diameter $I_a$ on the other end 1a side is smaller than the inner diameter $i_0$ of the center portion 1d. That is, the metal pipe 401' having a thickened end portion includes the other end side thickened portion (second thickened portion) 401c on the other end 1a side in addition to the one end side thickened portion 201c.

In addition, the metal pipe 401' having a thickened end portion includes a taper portion (second taper portion) 401f in which the thickness gradually increases from $t_0$ to $T_a$ between the thin portion 1e and the other end side thickened portion 401c.

Moreover, detail descriptions with respect to portions having configurations similar to those of the metal pipe 1' having a thickened end portion according to the first embodiment, the metal pipe 201' having a thickened end portion according to the second embodiment, and the metal pipe 301' having a thickened end portion according to the third embodiment are omitted.

Similarly to the metal pipe 1' having a thickened end portion, the metal pipe 201' having a thickened end portion, and the metal pipe 301' having a thickened end portion, the metal pipe 401' having a thickened end portion is manufactured with the metal pipe 1 as a material. Since the metal pipe 1 is similar to those of the first to third embodiments, descriptions thereof are omitted.

The thickness T of the one end side thickened portion 201c and the thickness $T_a$ of the other end side thickened portion 401c in the metal pipe 401' having a thickened end portion are larger than the thickness $t_0$ of the center portion 1d (thin portion 1e). In addition, as described above, the inner diameter $I_b$ of the one end side thickened portion 201c and the inner diameter $I_a$ of the other end side thickened portion 401c in the metal pipe 401' having a thickened end portion are smaller than the inner diameter $i_0$ in the center portion 1d (thin portion 1e). Meanwhile, in the metal pipe 401' having a thickened end portion, the outer diameter of the one end side thickened portion 201c, the outer diameter of the other end side thickened portion 401c, and the outer diameter of the center portion 1d (thin portion 1e) are $d_0$, and have the same size as each other.

In the metal pipe 401' having a thickened end portion, the thickness T of the one end side thickened portion 201c and the thickness $T_a$ of the other end side thickened portion 401c may be the same as each other, or may be different from each other. That is, in the metal pipe 401' having a thickened end portion, the inner diameter $I_b$ of the one end side thickened portion 201c and the inner diameter $I_a$ of the other end side thickened portion 401c may be the same as each other, or may be different from each other.

Moreover, in the metal pipe 401' having a thickened end portion, the longitudinal length $E_b$ of the one end side thickened portion 201c and the longitudinal length $E_a$ of the other end side thickened portion 401c may be the same as each other, or may be different from each other.

The other end side thickened portion 401c is similar to the one end side thickened portion 201c in that the high hardness portion (not shown) and the low hardness portion (not shown) are alternately provided in the circumferential direction.

(Fourth Embodiment, Method of Manufacturing Metal Pipe 401' Having Thickened End Portion)

Next, a method of manufacturing the metal pipe 401' having a thickened end portion according to the fourth embodiment will be described. Since the method of manufacturing the metal pipe 401' having a thickened end portion according to the fourth embodiment includes a first process and a second process, first, the first process will be described.

[First Process]

Figure 20:
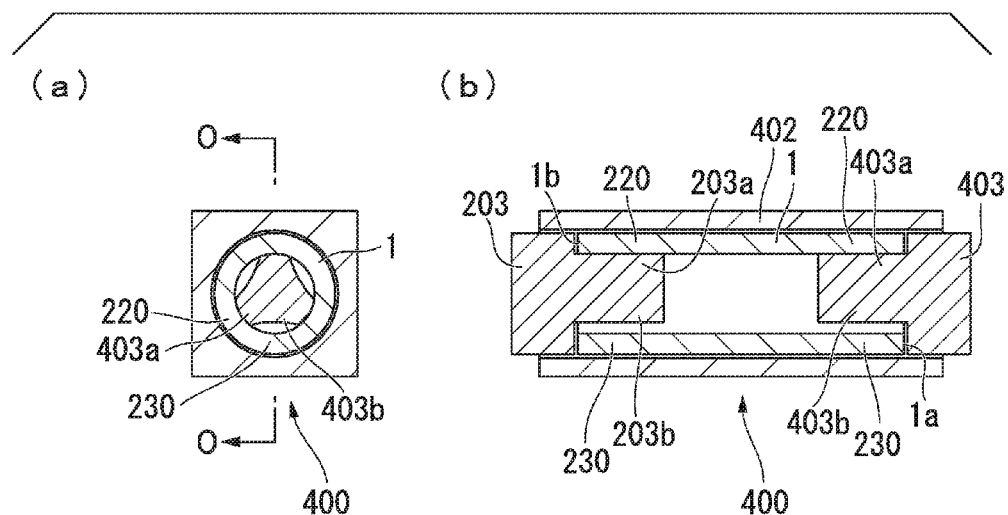
FIG. 20 is an explanatory view showing a state of a manufacturing device of the metal pipe having a thickened end portion according to the fourth embodiment before thickening is performed, (a) is a longitudinal sectional view on the other end side, and (b) is a sectional view taken along line O-O in (a).

FIG. 20 is an explanatory view showing a state of a manufacturing device 400 of the metal pipe 401' having a thickened end portion according to the fourth embodiment before thickening is performed, (a) is a longitudinal sectional view on the other end 1a side, and (b) is a sectional view taken along line O-O in (a).

As shown in FIG. 20, the manufacturing device 400 of the metal pipe 401' having a thickened end portion includes a die 402, the axial press punch (first axial press punch) 203, and an axial press punch (third axial press punch) 403.

The configuration on the one end 1b side of the die 402 according to the present embodiment is similar to the configuration on the one end 1b side of the die 202 according to the second embodiment. Meanwhile, the configuration on the other end 1a side of the die 402 according to the present embodiment is different from the configuration on the other end 1a side of the die 202 according to the second embodiment, and the other end 1a side is configured to be fitted to the axial press punch 403.

The axial press punch 403 includes a thickening prevention portion 403a and a thickening formation portion 403b. The thickening prevention portion 403a of the axial press punch 403 abuts on the axial press punch abutting portion 220 of the metal pipe 1. Meanwhile, the thickening formation portion 403b of the axial press punch 403 does not abut on the axial press punch non-abutting portion 230 of the metal pipe 1.

The axial press punch 403 shown in FIG. 20 includes three thickening prevention portions 403a and three thickening formation portion 403b.

In this way, in a state where the metal pipe 1 and the manufacturing device 400 of the metal pipe 401' having a thickened end portion are disposed, the axial press punch 203 is axially pressed toward the other end 1a side, and the axial press punch 403 is axially pressed toward the one end 1b side.

Figure 21:
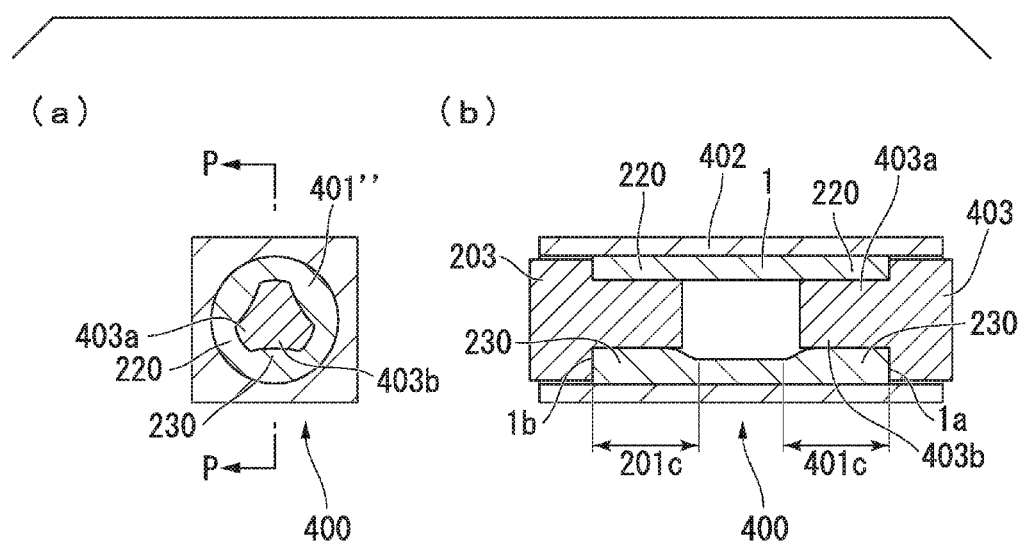
FIG. 21 is an explanatory view showing the state of the manufacturing device of the metal pipe having a thickened end portion when a first process ends, (a) is a longitudinal sectional view on the other end side, and (b) is a sectional view taken along line P-P in (a).

FIG. 21 is an explanatory view showing the state of the manufacturing device 400 of the metal pipe 401' having a thickened end portion when the first process ends, (a) is a longitudinal sectional view on the other end 1a side, and (b) is a sectional view taken along line P-P in (a).

As shown in FIG. 21, according to the first process of the method of manufacturing the metal pipe 401' having a thickened end portion according to the present embodiment, it is possible to thicken not only the axial press punch non-abutting portion 230 on the one end 1b side of the metal pipe 1 but also the axial press punch non-abutting portion 230 on the other end 1a side. That is, not only the one end side thickened portion 201c is formed on the one end 1b side of the metal pipe 1, but the other end side thickened portion 401c is also formed on the other end 1a side.

In addition, the metal pipe 1 after the first process is performed is referred to as an intermediate metal pipe 401".

[Second Process]

Next, in the second process, the intermediate metal pipe 401" produced in the first process is compressed in the longitudinal direction to thicken the axial press punch abutting portion 220, and the metal pipe 401' having a thickened end portion is manufactured.

Figure 22:
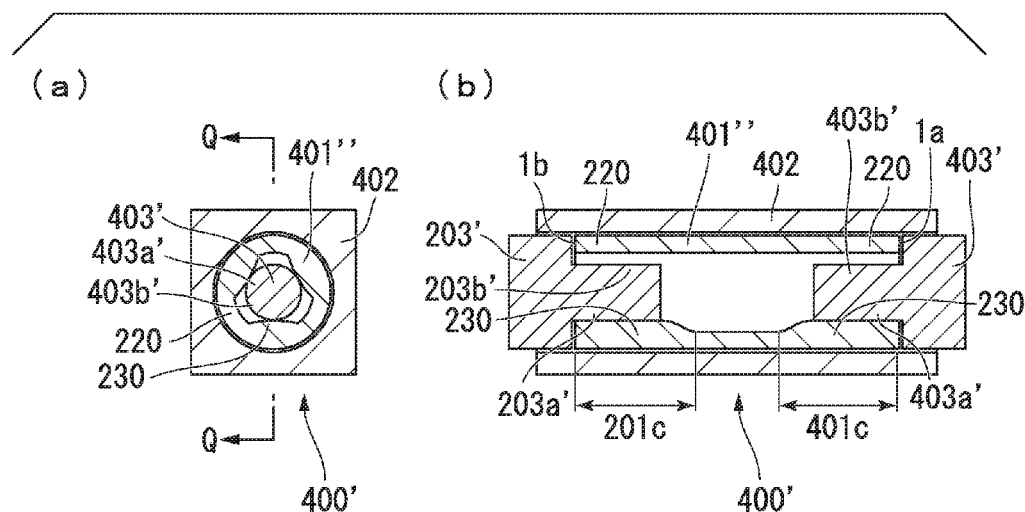
FIG. 22 is an explanatory view showing the state of the manufacturing device of the metal pipe having a thickened end portion before a second process starts, (a) is a longitudinal sectional view on the other end side, and (b) is a sectional view taken along line Q-Q in (a).

FIG. 22 is an explanatory view showing the state of a manufacturing device 400' of the metal pipe 401' having a thickened end portion before the second process starts, (a) is a longitudinal sectional view on the other end 1a side, and (b) is a sectional view taken along line Q-Q in (a).

As shown in FIG. 22, the second process is similar to the first process in that the die 402 is used. However, the second process is different from the first process in that the axial press punch (second axial press punch) 203' is used on the one end 1b side of the metal pipe 1 and the axial press punch (fourth axial press punch) 403' is used on the other end 1a side. The axial press punch 403' includes a thickening prevention portion 403a' and a thickening formation portion 403b'. The thickening prevention portion 403a' abuts on the axial press punch non-abutting portion 230 of the intermediate metal pipe 401". Meanwhile, the thickening formation portion 403b' does not abut on the axial press punch abutting portion 220 of the intermediate metal pipe 401".

In the state of being disposed as described above, the axial press punch 203' is axially pressed toward the other end 1a side, and the axial press punch 403' is axially pressed toward the one end 1b side.

Figure 23:
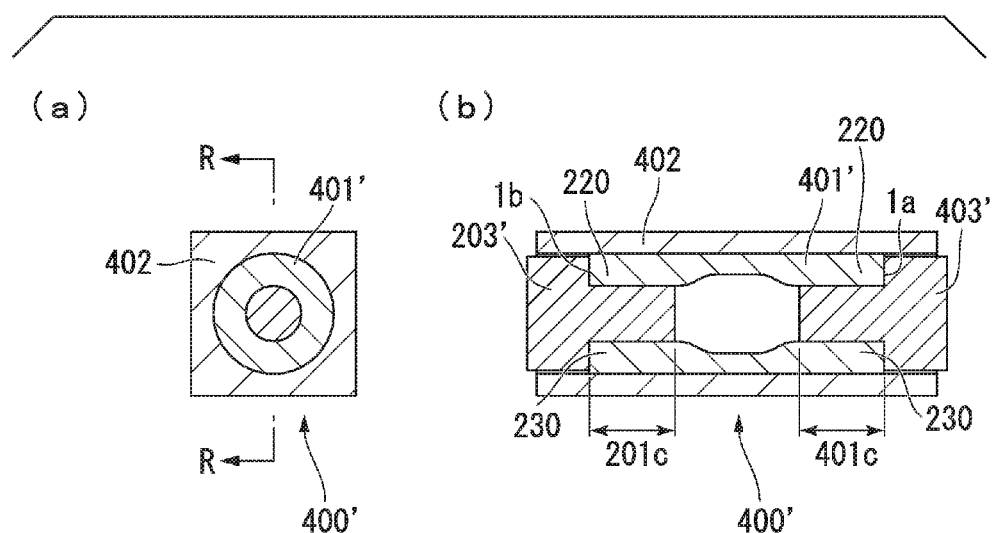
FIG. 23 is an explanatory view showing the state of the manufacturing device of the metal pipe having a thickened end portion when the second process ends, (a) is a longitudinal sectional view on the other end side, and (b) is a sectional view taken along line R-R in (a).

FIG. 23 is an explanatory view showing the state of the manufacturing device 400' of the metal pipe 401' having a thickened end portion when the second process ends, (a) is a longitudinal sectional view on the other end 1a side, and (b) is a sectional view taken along line R-R in (a).

As shown in FIG. 23, the second process is performed, and the axial press punch abutting portions 220 on the one end 1b side and the other end 1a side of the metal pipe 1 are thickened. Accordingly, it is possible to manufacture the metal pipe 401' having a thickened end portion in which the one end 1b side and the other end 1a side are thickened.

In addition, when the one end side thickened portion 201c (or other end side thickened portion 401c) is formed on both ends of the metal pipe 1, in the first process, the case where the axial press punch 203 is used on the one end 1b side of the metal pipe 1 and the axial press punch 403 is used on the other end 1a side is described. However, the axial press punch 203 (or the axial press punch 403) may be used on both the one end 1b side and the other end 1a side.

Similarly, when the one end side thickened portion 201c (or the other end side thickened portion 401c) is formed on both ends of the metal pipe 1, in the second process, the case where the axial press punch 203' is used on the one end 1b side of the metal pipe 1 and the axial press punch 403' is used on the other end 1a side is described. However, the axial press punch 203' (or axial press punch 403') may be used on both the one end 1b side and the other end 1a side.

(Fifth Embodiment, Metal Pipe 501' Having Thickened End Portion)

Next, a metal pipe 501' having a thickened end portion according to a fifth embodiment will be described.

Figure 24:
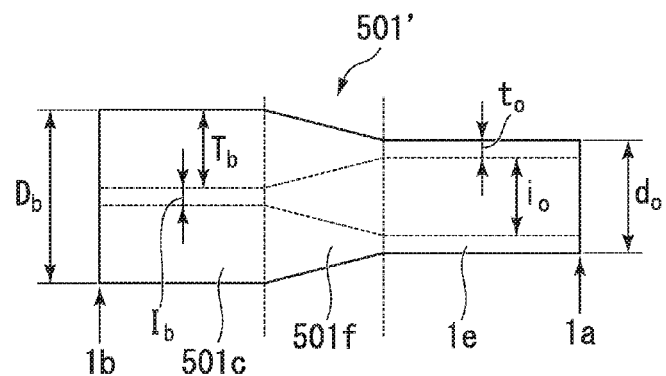
FIG. 24 is a schematic view showing a metal pipe having a thickened end portion according to a fifth embodiment when viewed in a longitudinal direction.

FIG. 24 is a schematic view showing the metal pipe 501' having a thickened end portion according to the fifth embodiment. In the metal pipe 1' having a thickened end portion shown in FIG. 2, the inner diameter $i_0$ on the one end 1b side is the same as the inner diameter $i_0$ on the other end 1a side while the outer diameter $D_b$ on the one end 1b side is larger than the outer diameter $d_0$ on the other end 1a side. In addition, in the metal pipe 201' having a thickened end portion shown in FIG. 8, the outer diameter $d_0$ on the one end 1b side is the same as the outer diameter $d_0$ on the other end 1a side while the inner diameter $I_b$ on the one end 1b side is smaller than the inner diameter $i_0$ on the other end 1a side. Meanwhile, in the metal pipe 501' having a thickened end portion according to the present embodiment, the outer diameter $D_b$ on the one end 1b side is larger than the outer diameter $d_0$ on the other end 1a side, and the inner diameter $I_b$ on the one end 1b side is larger than the inner diameter $i_0$ on the other end 1a side. That is, the metal pipe 501' having a thickened end portion includes the one end side thickened portion 501c on the one end 1b side.

In addition, detail descriptions with respect to portions having configurations similar to those of the metal pipe 1' having a thickened end portion according to the first embodiment, the metal pipe 201' having a thickened end portion according to the second embodiment, the metal pipe 301' having a thickened end portion according to the third embodiment, and the metal pipe 401' having a thickened end portion according to the fourth embodiment are omitted.

Similarly to the metal pipe 1' having a thickened end portion, the metal pipe 201' having a thickened end portion, the metal pipe 301' having a thickened end portion, and the metal pipe 401' having a thickened end portion, the metal pipe 501' having a thickened end portion is manufactured with the metal pipe 1 as a material. Since the metal pipe 1 is similar to those of the first to fourth embodiments, descriptions thereof are omitted.

As described above, in the metal pipe 501' having a thickened end portion according to the present embodiment, the outer diameter $D_b$ of the one end side thickened portion 501c is larger than the outer diameter $D_a$ on the other end 1a (thin portion 1e) side, and the inner diameter $I_b$ of the one end side thickened portion 501c is smaller than the inner diameter $i_0$ on the other end 1a (thin portion 1e) side. That is, in the metal pipe 501' having a thickened end portion according to the present embodiment, the inner circumferential surface and the outer circumferential surface of the metal pipe 1 on the one end 1b side are thickened. Accordingly, a thickness $T_b$ of the one end side thickened portion 501c of the metal pipe 501' having a thickened end portion is larger than the thickness $t_0$ on the other end 1a (thin portion 1e) side.

In addition, the metal pipe 501' having a thickened end portion has a taper portion 501f in which the thickness gradually increases from $t_0$ to $T_b$ between the one end side thickened portion 501c and the thin portion 1e.

Preferably, $T_b/t_0$ is 1.2 or more, which is a ratio (the thickness increase ratio) obtained by dividing the thickness $T_b$ of the one end side thickened portion 501c by the thickness $t_0$ of the thin portion 1e. More preferably, $T_b/t_0$ is 1.4 or more, and still more preferably, $T_b/t_0$ is 2.0 or more.

Similarly to the one end side thickened portion 1c, the one end side thickened portion 501c alternately includes the high hardness portion (not shown) and the low hardness portion (not shown) in the circumferential direction.

(Fifth Embodiment, Method of Manufacturing Metal Pipe 501' Having Thickened End Portion)

Next, a method of manufacturing the metal pipe 501' having a thickened end portion according to the fifth embodiment will be described. Since the method of manufacturing the metal pipe 501' having a thickened end portion according to the fifth embodiment includes a first process and a second process, first, the first process will be described.

[First Process]

Figure 25:
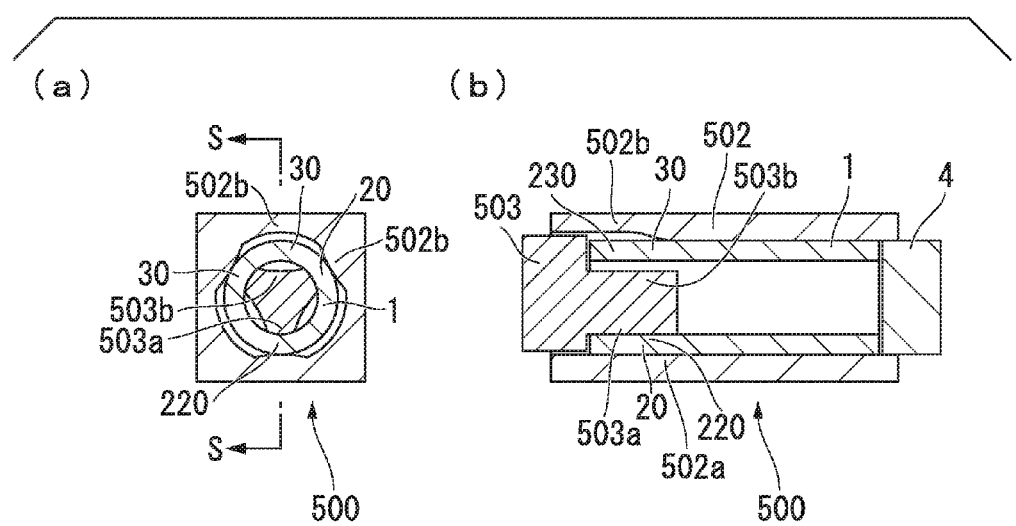
FIG. 25 is an explanatory view showing a state of a manufacturing device of the metal pipe having a thickened end portion according to the fifth embodiment before thickening is performed, (a) is a longitudinal sectional view on one end side, and (b) is a sectional view taken along line S-S in (a).

FIG. 25 is an explanatory view showing a state of a manufacturing device 500 of the metal pipe 501' having a thickened end portion according to the fifth embodiment before thickening is performed, (a) is a longitudinal sectional view on the one end 1b side, and (b) is a sectional view taken along line S-S in (a).

As shown in FIG. 25, the manufacturing device 500 of the metal pipe 501' having a thickened end portion includes a die 502, an axial press punch 503, and the punch 4.

The die (first die) 502 according to the fifth embodiment includes a thickening prevention portion 502a and a thickening formation portion 502b on the one end 1b side. The thickening prevention portion 502a abuts on the die abutting portion 20. The thickening formation portion 502b does not abut on the die non-abutting portion 30. The die 502 shown in FIG. 25 includes three thickening prevention portions 502a and three thickening formation portions 502b.

The axial press punch (first axial press punch) 503 according to the fifth embodiment includes a thickening prevention portion 503a and a thickening formation portion 503b on the one end 1b side. The thickening prevention portion 503a abuts on the axial press punch abutting portion 220. The thickening formation portion 503b does not abut on the axial press punch non-abutting portion 230. The axial press punch 503 shown in FIG. 25 includes three thickening prevention portions 503a and three thickening formation portions 503b.

Since the punch 4 configuring the manufacturing device 500 of the metal pipe 501' having a thickened end portion is similar to the punch 4 according to the first embodiment, detail descriptions thereof is omitted.

In the state where the metal pipe 1, the die 502, the axial press punch 503, and the punch 4 are disposed as described above, the axial press punch 503 is axially pressed toward the other end 1a side.

Figure 26:
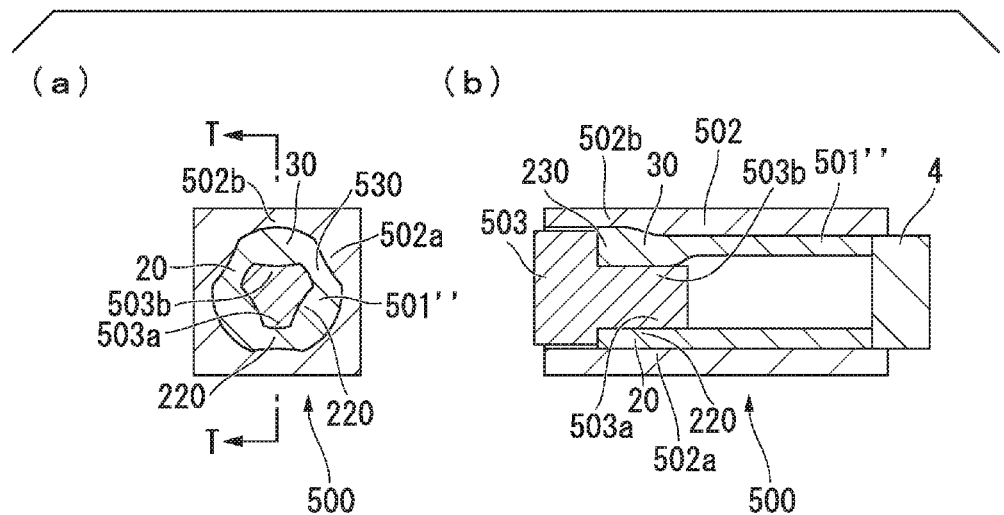
FIG. 26 is an explanatory view showing the state of the manufacturing device of the metal pipe having a thickened end portion when a first process ends, (a) is a longitudinal sectional view on one end side, and (b) is a sectional view taken along line T-T in (a).

FIG. 26 is an explanatory view showing the state of the manufacturing device 500 of the metal pipe 501' having a thickened end portion when the first process ends, (a) is a longitudinal sectional view on the one end 1b side, and (b) is a sectional view taken along line T-T in (a).

As shown in FIG. 26, according to the first process of the present embodiment, the die abutting portion 20 and the axial press punch abutting portion 220 are not thickened while the die non-abutting portion 30 and the axial press punch non-abutting portion 230 are thickened on the one end 1b side of the metal pipe 1.

In addition, the metal pipe 1 after the first process is performed is referred to as an intermediate metal pipe 501''.

[Second Process]

Next, in the second process, the intermediate metal pipe 501'' produced by the first process is compressed in the longitudinal direction to thicken the die abutting portion 20 and the axial press punch abutting portion 220, and the metal pipe 501' having a thickened end portion is manufactured.

Figure 27:
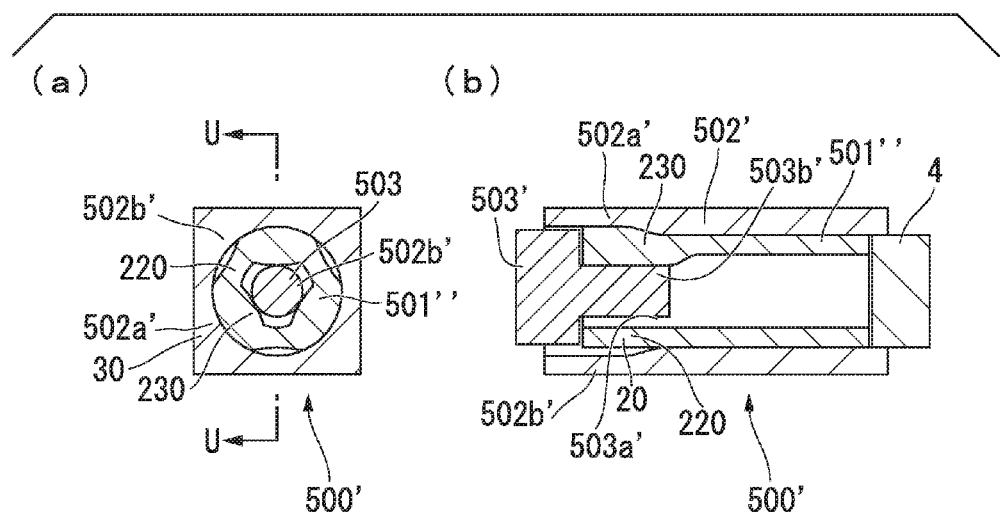
FIG. 27 is an explanatory view showing the state of the manufacturing device of the metal pipe having a thickened end portion before a second process starts, (a) is a longitudinal sectional view on one end side, and (b) is a sectional view taken along line U-U in (a).

FIG. 27 is an explanatory view showing a state of the manufacturing device 500' of the metal pipe 501' having a thickened end portion before the second process starts, (a) is a longitudinal sectional view on the one end 1b side, and (b) is a sectional view taken along line U-U in (a).

As shown in FIG. 27, the manufacturing device 500' of the metal pipe 501' having a thickened end portion includes a die (second die) 502', an axial press punch (second axial press punch) 503', and the punch 4.

The die 502' includes a thickening prevention portion 502a' and a thickening formation portion 502b' on the one end 1b side. The thickening prevention portion 502a' abuts on the die non-abutting portion 30. The thickening formation portion 502b' does not abut on the die abutting portion 20.

The axial press punch 503' includes a thickening prevention portion 503a' and a thickening formation portion 503b' on the one end 1b side. The thickening prevention portion 503a' abuts on the axial press punch non-abutting portion 230. The thickening formation portion 503b' does not abut on the axial press punch abutting portion 220.

Since the configuration of the punch 4 is similar to that of the punch 4 according to the first embodiment, detail descriptions thereof are omitted.

In the state where the metal pipe 1, the die 502', the axial press punch 503', and the punch 4 are disposed as described above, the axial press punch 503' is axially pressed toward the other end 1a side.

Figure 28:
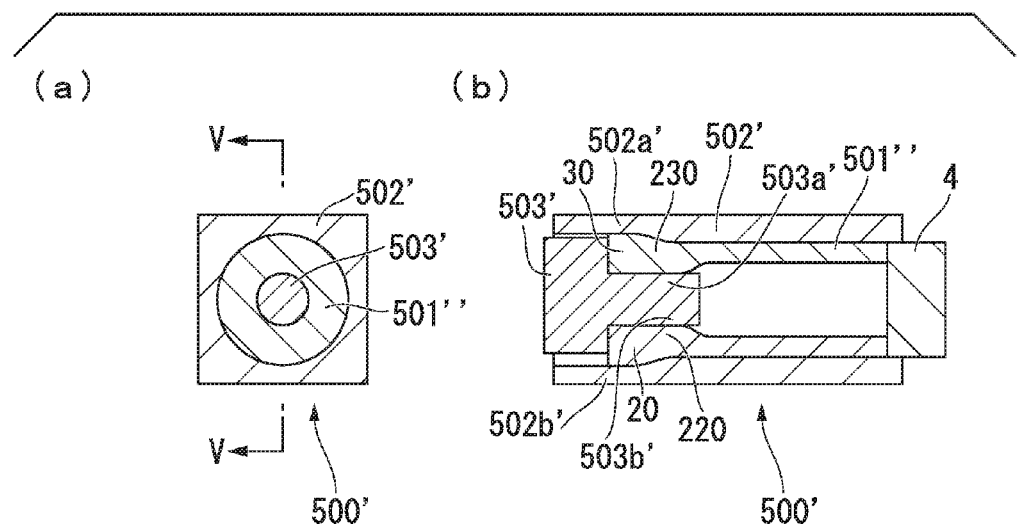
FIG. 28 is an explanatory view showing the state of the manufacturing device of the metal pipe having a thickened end portion when the second process ends, (a) is a longitudinal sectional view on one end side, and (b) is a sectional view taken along line V-V in (a).

FIG. 28 is an explanatory view showing the state of the manufacturing device 500' of the metal pipe 501' having a thickened end portion when the second process ends, (a) is a longitudinal sectional view on the one end 1b side, and (b) is a sectional view taken along line V-V in (a).

As shown in FIG. 28, the second process is performed, and the die abutting portion 20 and the axial press punch abutting portion 220 are thickened and the die non-abutting portion 30 and the axial press punch non-abutting portion 230 are not thickened on the one end side 1b of the intermediate metal pipe 501". Accordingly, the metal pipe 501' having a thickened end portion is manufactured.

According to the method of manufacturing the metal pipe 501' having a thickened end portion according to the present embodiment, the inner surface side and the outer surface side are thickened on the one end 1b side of the metal pipe without occurring buckling, and it is possible to manufacture the metal pipe 501' having a thickened end portion.

In addition, the present invention is not limited to the above-described embodiments. The present invention includes modifications, combinations, or the like of the configurations within a scope which does not depart from the gist of the present invention. In addition, it is needless to say that appropriate combinations of the configurations shown in respective embodiments can be used.

Figure 29:
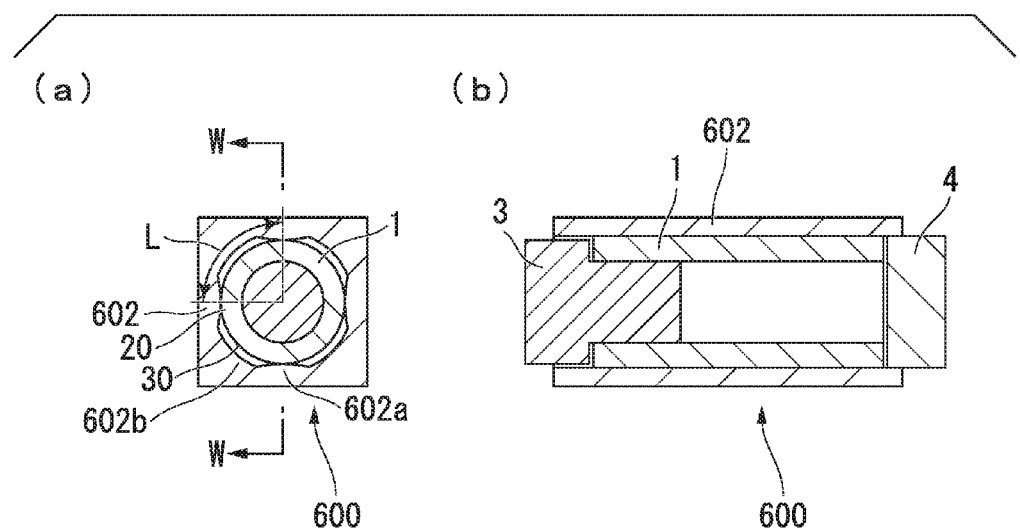
FIG. 29 is an explanatory view showing the state of the manufacturing device of the metal pipe having a thickened end portion before the first process is performed in a case where a first die having four thickening prevention portions and four thickening formation portions is used, (a) is a longitudinal sectional view on one end 1b side, and (b) is a sectional view taken along line W-W in (a).

For example, in the first process of the method of manufacturing the metal pipe 1' having a thickened end portion according to the first embodiment, the die 2 which includes three thickening prevention portions 2a and three thickening formation portions 2b are formed on the inner surface is used. However, the die 2 which is used in the first process of the method of manufacturing the metal pipe 1' having a thickened end portion according to the first embodiment is not limited to this. For example, a manufacturing device 600 of the metal pipe having a thickened end portion shown in FIG. 29 includes a die 602 in which four thickening prevention portions 602a and four thickening formation portions 602b are formed on the inner surface.

Figure 30:
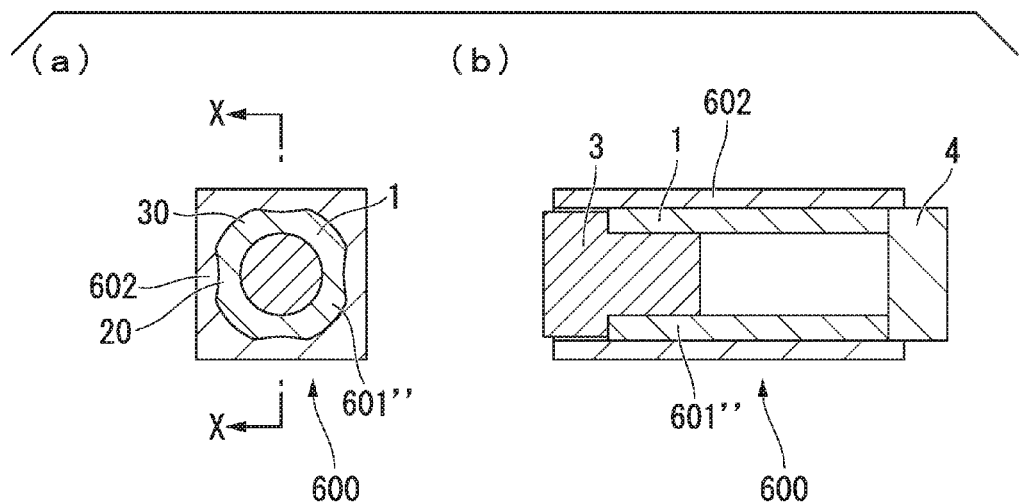
FIG. 30 is an explanatory view showing the state of the manufacturing device of the metal pipe having a thickened end portion when the first process ends in the case where the first die having the four thickening prevention portions and the four thickening formation portions is used, (a) is a longitudinal sectional view on one end 1b side, and (b) is a sectional view taken along line X-X in (a).

FIG. 30 shows a state where the first process is performed on the metal pipe 1 using the die 602. As shown in FIG. 30, in an intermediate metal pipe 601", four die non-abutting portions 30 which are provided in the circumferential direction are thickened. Meanwhile, in an intermediate metal pipe 601", four die abutting portions 20 which are provided in the circumferential direction are not thickened.

Figure 31:
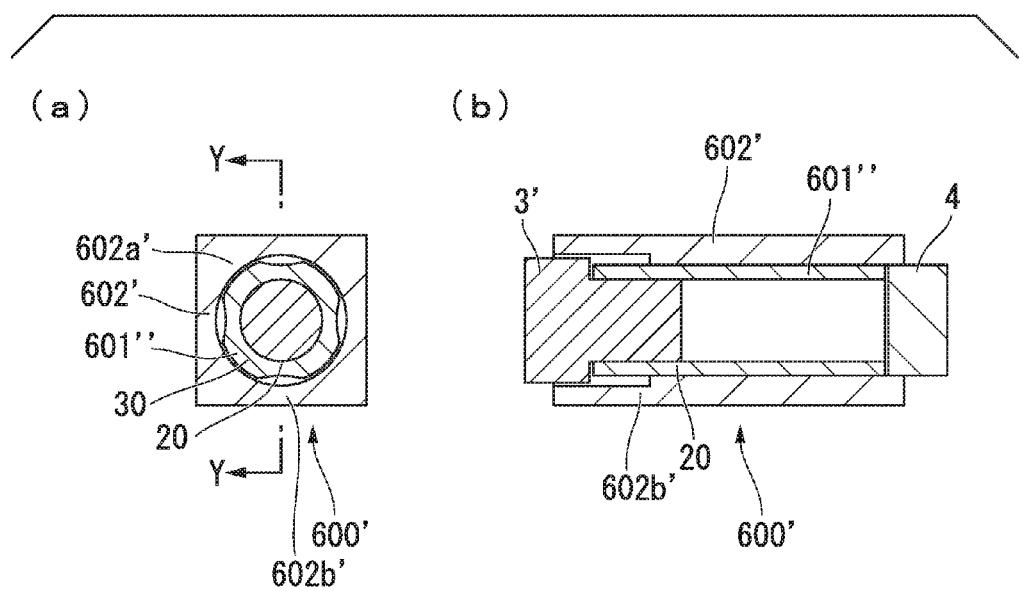
FIG. 31 is an explanatory view showing the state of the manufacturing device of the metal pipe having a thickened end portion before the second process is performed in the case where the first die having the four thickening prevention portions and the four thickening formation portions is used, (a) is a longitudinal sectional view on one end 1b side, and (b) is a sectional view taken along line Y-Y in (a).

FIG. 31 is an explanatory view showing the state of a manufacturing device 600' of the metal pipe 601' having a thickened end portion before the second process is performed, (a) is a longitudinal sectional view on one end 1b side, and (b) is a sectional view taken along line Y-Y in (a).

As shown in FIG. 31, a die (second die) 602' includes four thickening prevention portions 602a' and four thickening formation portions 602b' on the one end 1b side of the intermediate metal pipe 601". From the state shown in FIG. 31, the axial press punch 3' is axially pressed toward the other end 1a side.

Figure 32:
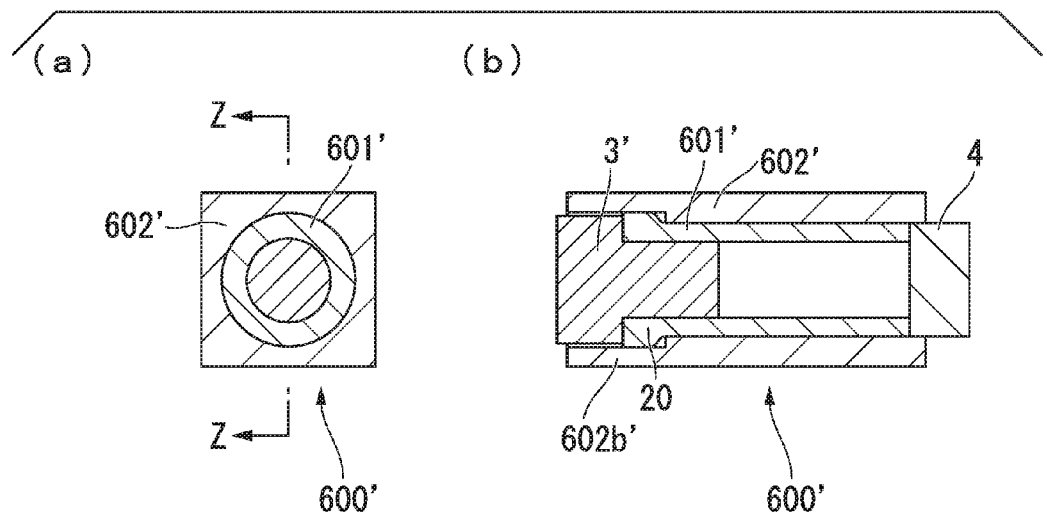
FIG. 32 is an explanatory view showing the state of the manufacturing device of the metal pipe having a thickened end portion when the second process ends in the case where a die having the four thickening prevention portions and the four thickening formation portions is used, (a) is a longitudinal sectional view on one end 1b side, and (b) is a sectional view taken along line Z-Z in (a).

FIG. 32 is an explanatory view showing the state of the manufacturing device 600' of the metal pipe 601' having a thickened end portion after the second process is performed, (a) is a longitudinal sectional view on one end 1b side, and (b) is a sectional view taken along line Z-Z in (a).

As shown in FIG. 32, according to the second process, the die abutting portion 20 of the intermediate metal pipe 601" is thickened, and the metal pipe 601' having a thickened end portion is manufactured.

Figure 33:
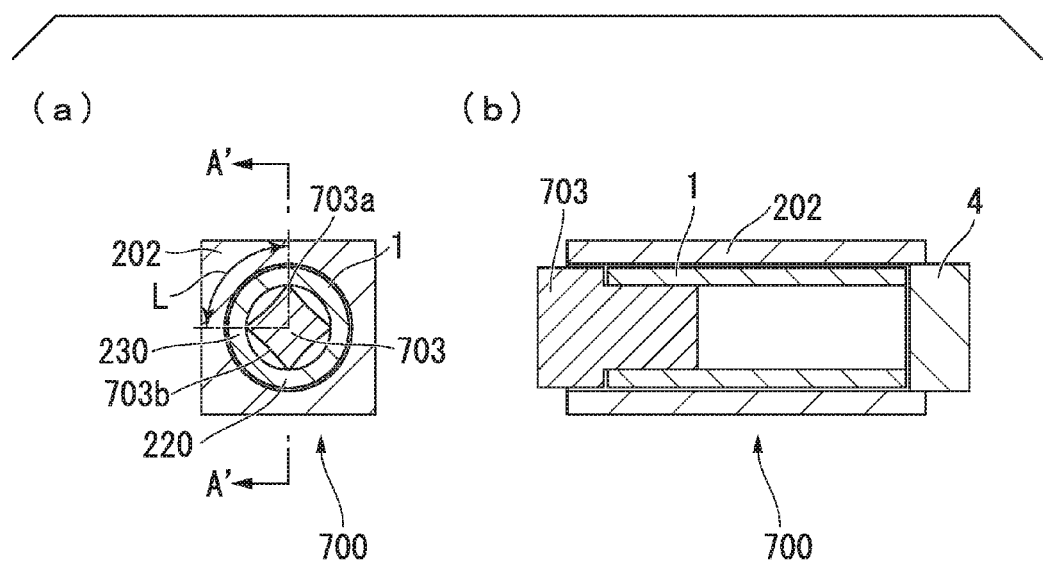
FIG. 33 is an explanatory view showing the state of the manufacturing device of the metal pipe having a thickened end portion before the first process is performed in the case where an axial press punch having the four thickening prevention portions and the four thickening formation portions is used, (a) is a longitudinal sectional view on one end side, and (b) is a sectional view taken along line A'-A' in (a).

In the first process of the method of manufacturing the metal pipe 201' having a thickened end portion according to the second embodiment, the axial press punch (first axial press punch) 203 which includes three thickening prevention portions 203a and three thickening formation portions 203b are used on the inner surface of the portion inserted into the metal pipe 1. However, the first axial press punch 203 which is used in the first process of the method of manufacturing the metal pipe 201' having a thickened end portion according to the second embodiment is not limited to this. For example, as shown in FIG. 33, it is possible to use a first axial press punch 703 which includes four thickening prevention portions 703a and four thickening formation portions 703b on the inner surface on the portion inserted into the metal pipe 1.

Figure 34:
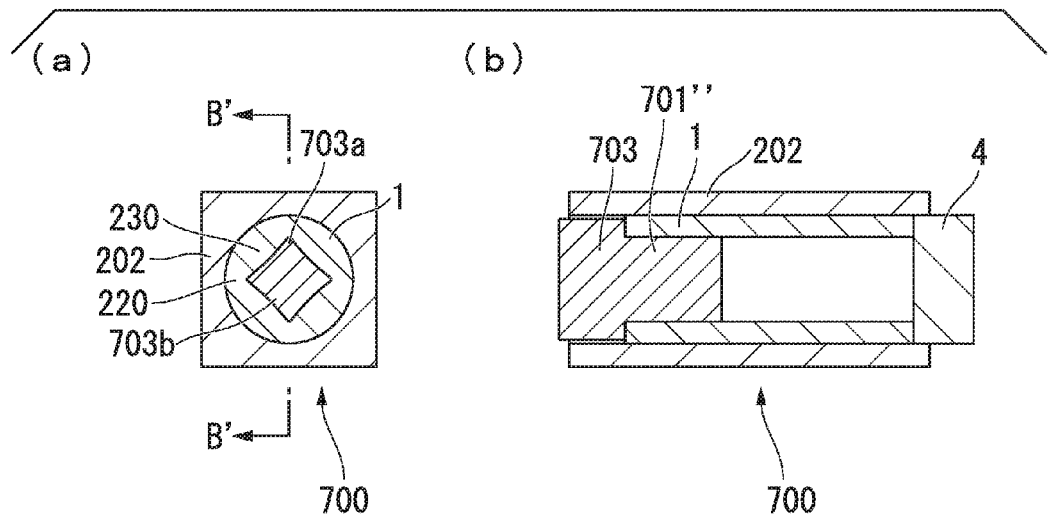
FIG. 34 is an explanatory view showing the state of the manufacturing device of the metal pipe having a thickened end portion when the first process ends in the case where an axial press punch having the four thickening prevention portions and the four thickening formation portions is used, (a) is a longitudinal sectional view on one end side, and (b) is a sectional view taken along line B'-B' in (a).

FIG. 34 shows a state after the first process is performed using the first axial press punch 703. As shown in FIG. 34, the first process is performed on the metal pipe 1, four axial press punch non-abutting portions 230 on the one end 1b side are thickened, and the intermediate metal pipe 701" is manufactured.

Figure 35:
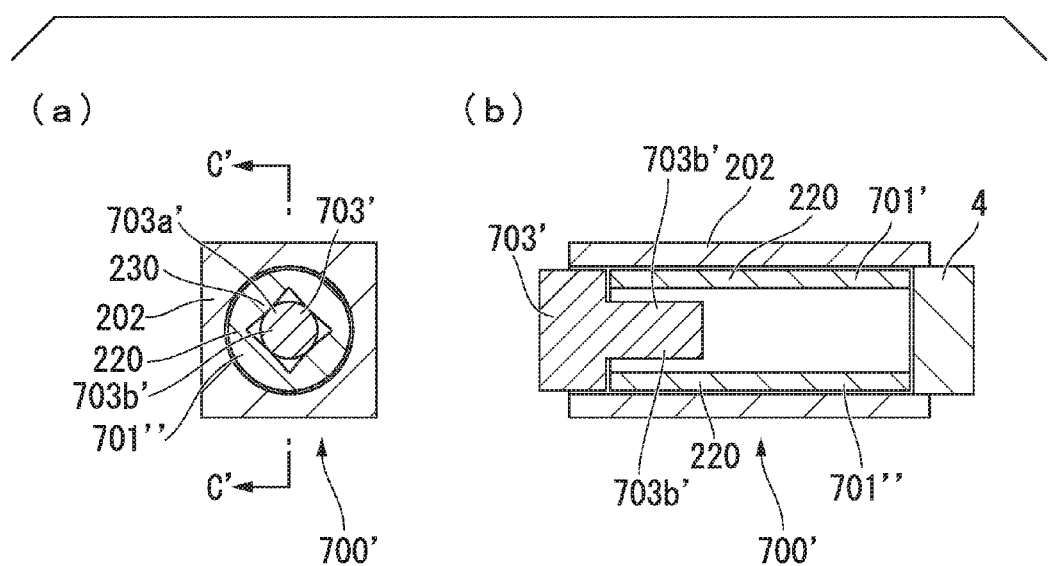
FIG. 35 is an explanatory view showing the state of the manufacturing device of the metal pipe having a thickened end portion before the second process is performed in the case where the axial press punch having the four thickening prevention portions and the four thickening formation portions is used, (a) is a longitudinal sectional view on one end side, and (b) is a sectional view taken along line C'-C' in (a).

FIG. 35 is an explanatory view showing a state of a manufacturing device 700' of a metal pipe 701' having a thickened end portion before the second process is performed, (a) is a longitudinal sectional view on the one end side 1b, and (b) is a sectional view taken along line C'-C' in (a).

As shown in FIG. 35, an axial press punch (second axial press punch) 703' includes four thickening prevention portions 703a' and four thickening formation portions 703b' on the one end 1b side of the intermediate metal pipe 701". From the state shown in FIG. 35, the axial press punch 703' is axially pressed toward the other end 1a side.

Figure 36:
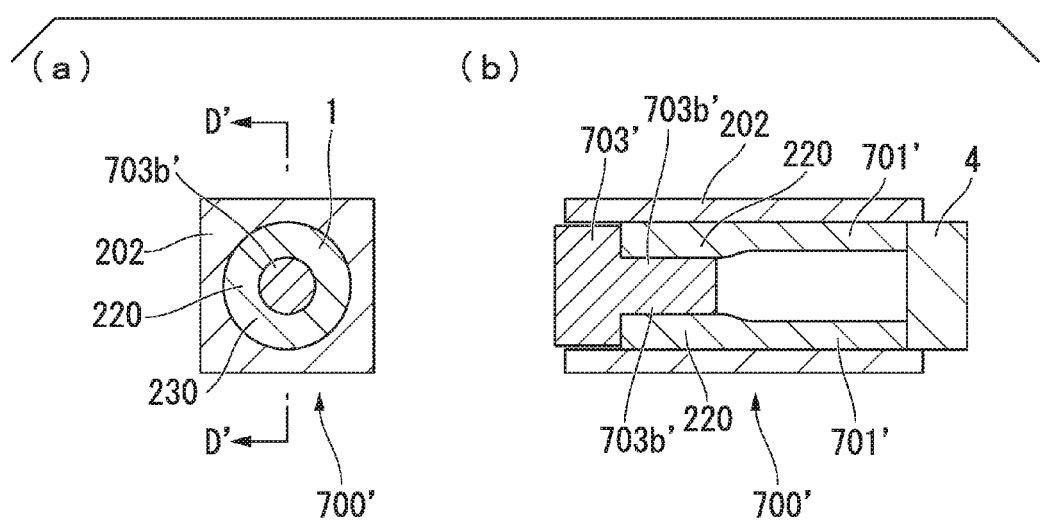
FIG. 36 is an explanatory view showing the state of the manufacturing device of the metal pipe having a thickened end portion when the second process ends in the case where the axial press punch having the four thickening prevention portions and the four thickening formation portions is used, (a) is a longitudinal sectional view, and (b) is a sectional view taken along line D'-D' in (a).

FIG. 36 is an explanatory view showing the state of the manufacturing device 700' of the metal pipe 701' having a thickened end portion after the second process is performed, (a) is a longitudinal sectional view on one end 1b side, and (b) is a sectional view taken along line D'-D' in (a).

As shown in FIG. 36, according to the second process, the axial press punch abutting portion 220 of the intermediate metal pipe 701" is thickened, and the metal pipe 701' having a thickened end portion is manufactured.

INDUSTRIAL APPLICABILITY

According to the embodiments, it is possible to provide a metal pipe having a thickened end portion in which at least one end is thickened at a large thickness increase ratio in a longitudinal direction without having a buckling portion, and a method of manufacturing the same.

BRIEF DESCRIPTION OF THE REFERENCE SYMBOLS 0, 0', 200, 200', 300, 300', 400, 400', 500, 500': MANUFACTURING DEVICE OF METAL PIPE HAVING THICKENED END PORTION
1: METAL PIPE
1c, 201c, 501c: ONE END SIDE THICKENED PORTION (FIRST THICKENED PORTION)
301c, 401c: OTHER END SIDE THICKENED PORTION (SECOND THICKENED PORTION)
1', 201', 301', 401', 501': METAL PIPE HAVING THICKENED END PORTION
1e: THIN PORTION
1f: TAPER PORTION (FIRST TAPER PORTION)
301f, 401f: TAPER PORTION (SECOND TAPER PORTION)
2, 202, 302, 402, 502, 602: DIE (FIRST DIE)
2', 302', 502', 602': DIE (SECOND DIE)
4: PUNCH

3, 203, 403, 403', 503, 503', 603, 603', 703: AXIAL PRESS PUNCH (FIRST AXIAL PRESS PUNCH)

3', 203', 503', 703': AXIAL PRESS PUNCH (SECOND AXIAL PRESS PUNCH)

303, 403: AXIAL PRESS PUNCH (THIRD AXIAL PRESS PUNCH)

303', 403': AXIAL PRESS PUNCH (FOURTH AXIAL PRESS PUNCH)

The invention claimed is:

1. A metal pipe having a thickened end portion, the metal pipe comprising:
   when viewed in a longitudinal direction of the metal pipe,
   a thin portion which has a thickness $t_0$;
   a first thickened portion which is provided on one end and has a thickness T which is larger than the thickness $t_0$; and
   a first taper portion which is provided between the thin portion and the first thickened portion and has the thickness which gradually increases from $t_0$ to T, wherein
   when a hardness of an inner surface of the first thickened portion is measured at a plurality of positions along a circumferential direction and the hardness is plotted with respect to the plurality of positions along the circumferential direction,
   a combination of at least one high hardness portion and at least one low hardness portion alternately appears, wherein the high hardness portion is represented by a waveform having a hardness which is 95% or more of a maximum hardness, and wherein the low hardness portion is represented by a waveform having a hardness which is less than 95% of the maximum hardness; and
   a plurality of the combinations of the at least one high hardness portion and the at least one low hardness portion are provided along the circumferential direction.

2. The metal pipe having a thickened end portion according to claim 1,
   wherein the thickness T of the first thickened portion is 1.2 times or more than the thickness $t_0$ of the thin portion.

3. The metal pipe having a thickened end portion according to claim 1,
   wherein a length of the first thickened portion in the longitudinal direction is 3 times or less than an outer circumferential length of the first thickened portion.

4. The metal pipe having a thickened end portion according to claim 1, the metal pipe further comprising:
   when viewed in the longitudinal direction of the metal pipe,
   a second thickened portion which is provided on the other end and has a thickness $T_a$ which is larger than $t_0$; and
   a second taper portion which is provided between the thin portion and the second thickened portion and has the thickness which gradually increases from $t_0$ to $T_a$.

5. The metal pipe having a thickened end portion according to claim 4,
   wherein the thickness $T_a$ of the second thickened portion is 1.2 times or more than the thickness $t_0$ of the thin portion.

6. The metal pipe having a thickened end portion according to claim 4,
   wherein a length of the second thickened portion in the longitudinal direction is 3 times or less than an outer circumferential length of the second thickened portion.

* * * * *